(12) United States Patent
Catlin et al.

(10) Patent No.: US 6,526,518 B1
(45) Date of Patent: Feb. 25, 2003

(54) PROGRAMMABLE BUS

(75) Inventors: Gary M. Catlin, San Jose, CA (US); Edwin E. Everman, II, Fremont, CA (US)

(73) Assignee: Creative Technology, Ltd., Singapore (SG)

( * ) Notice: Subject to any disclaimer, the term of this patent is extended or adjusted under 35 U.S.C. 154(b) by 0 days.

(21) Appl. No.: 09/082,650

(22) Filed: May 20, 1998

Related U.S. Application Data

(60) Provisional application No. 60/047,516, filed on May 22, 1997.

(51) Int. Cl.[7] ................................................ G06F 1/04
(52) U.S. Cl. .......................... 713/501; 710/33; 710/241
(58) Field of Search ........................ 710/33, 113, 126, 710/241, 305; 713/500–503

(56) References Cited

U.S. PATENT DOCUMENTS

| | | | | |
|---|---|---|---|---|
| 4,228,498 A | * | 10/1980 | Moshier | 364/200 |
| 5,263,172 A | * | 11/1993 | Olnowich | 395/800 |
| 5,428,746 A | | 6/1995 | Dalrymple | 395/275 |

FOREIGN PATENT DOCUMENTS

| | | | | |
|---|---|---|---|---|
| EP | 0206657 A1 | 12/1986 | | G06F/13/12 |
| EP | 0453199 A2 | 10/1991 | | G06F/13/42 |
| EP | 0588191 A1 | 3/1994 | | G06F/13/38 |

* cited by examiner

Primary Examiner—John Follansbee
(74) Attorney, Agent, or Firm—Van Pelt & Yi LLP

(57) ABSTRACT

The present inventions provide apparatuses and methods for implementing a programmable bus. A programmable bus provides greater functionality and versatility through the ability to manage data transfers according to a number of sample rate clocks. The number of processing components connected to the programmable bus may be varied without a significant amount of physical alternations. Also, the number of data transfers for a given number of processing components may be modified and scheduled accordingly by reprogramming the programmable bus. The programmable bus comprises a bus and a bus arbiter. The bus is coupled to the bus arbiter and a plurality of devices and the bus arbiter. The plurality of devices operate at different sample rate clocks. The bus arbiter schedules and conducts the transfer of data between the plurality of devices according to the sample rate clocks such that the plurality of devices send and receive data at appropriate times, corresponding to the sample rate clocks. Thus, the bus arbiter is programmable due to the ability to configure the bus arbiter to schedule and conduct the transfer of data between and among the plurality of devices. The plurality of buses may include interface circuitry to allow them to interface properly with the programmable bus. Each device includes an input buffer and an output buffer, the input buffer having a first and a second buffer, and the output buffer having a first and a second buffer. The programmable bus is further comprised of a buffer select line carrying a buffer select signal, such that the buffer select signal informs the plurality of devices whether to use the first or the second buffer of the input and output buffers for the transfer of data. Double buffering facilitates, in one embodiment, the transfer of data based upon different sample rate clocks.

4 Claims, 14 Drawing Sheets

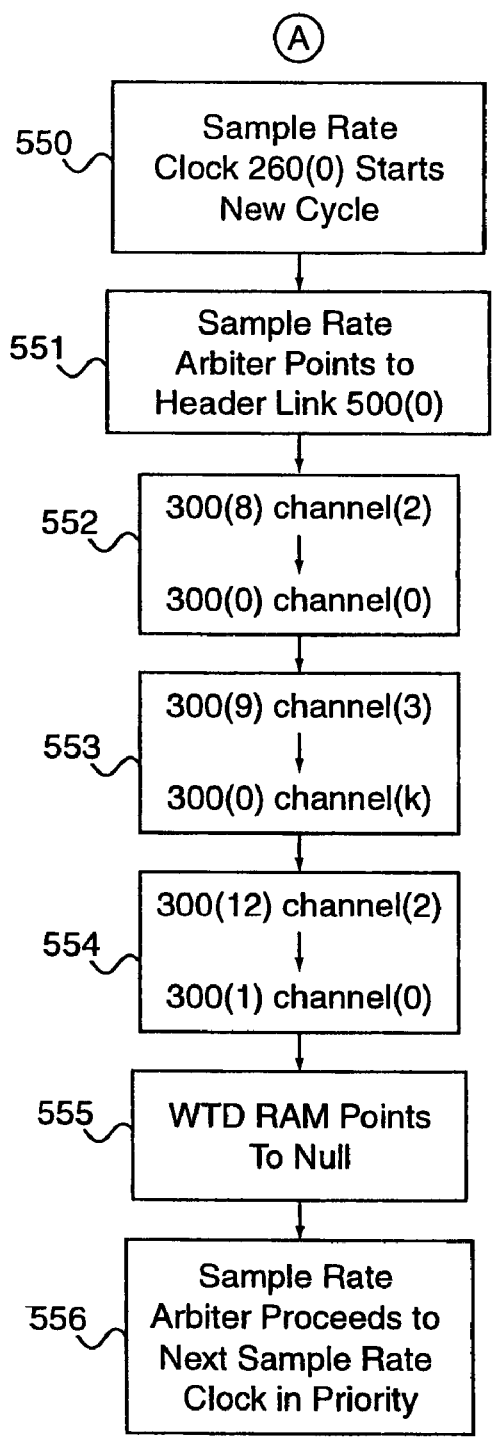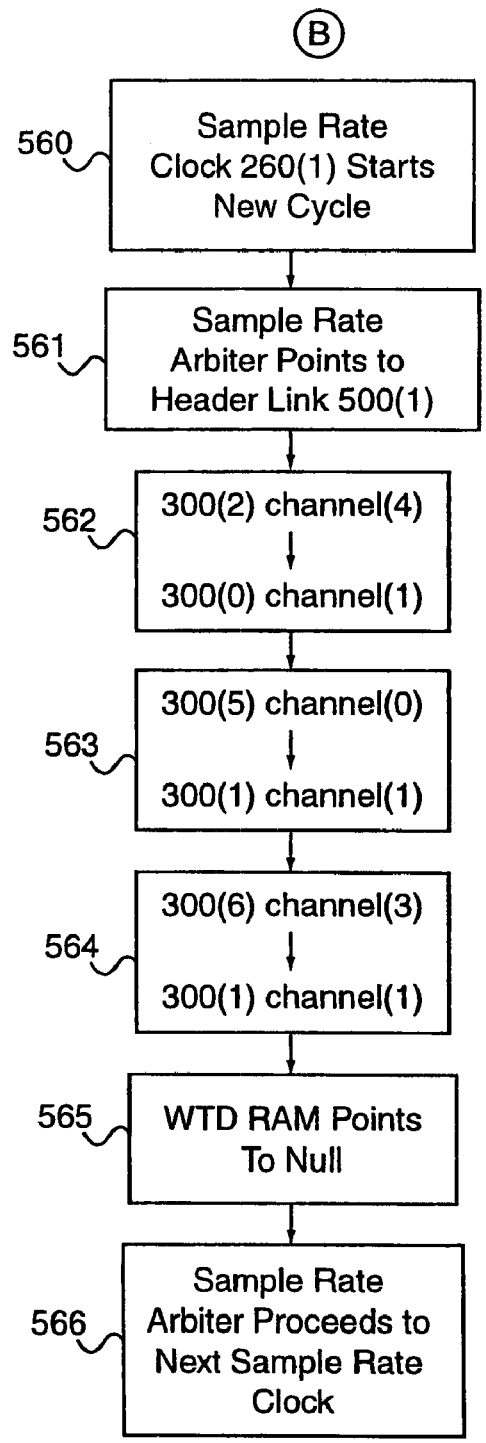
Fig. 10B
Fig. 10C

PROGRAMMABLE BUS

CROSS REFERENCE TO RELATED APPLICATIONS

This application claims benefit of priority under 35 U.S.C. 119(e) of U.S. Provisional Application No. 60/047,516, filed May 22, 1997 and entitled "Real Time Audio Processing Method and Architecture Using An Audio Data Bus," by Gary M. Catlin and Edwin E. Everman II, which is hereby incorporated by reference.

BACKGROUND OF THE INVENTION

The present invention relates generally to the field of buses utilized to facilitate communication between electronic devices, as well as buses implemented within integrated circuits. The present invention is more particularly related to methods and apparatuses for providing a programmable data bus.

Buses interconnect logic devices to allow the devices to communicate with each other. Typically, buses include an address bus and a data bus. In order to communicate, an address is provided on the address bus indicating which piece of information is being sent or retrieved. The corresponding piece of data is also provided on the data bus. Methods and techniques for reading and writing information to and from logic devices are well known in the art and will not be discussed in greater detail.

Typically, buses have been used to inter connect logic devices or integrated circuits in one of two manners. In one instance data flow is serial in nature. That is, data is passed from one integrated circuit to another integrated circuit through a bus and then passed on to a subsequent integrated circuit through another bus, referring to FIG. 1A. FIG. 1A is a block diagram of a prior art method of utilizing buses. Chip layout 10 may include a direct memory access (DMA) chip 12, a mixer 14 and a coder/decoder (CODEC) 16. The integrated circuits are coupled together through buses 13 and 15. Buses 13 and 15 generally include an address bus and a data bus.

Data from DMA 12 may be relayed to mixer 14 through bus 13 in order to allow mixer 14 to perform operations on the data passed along from DMA 12. In this example, the data passed to mixer 14 may then be passed on to CODEC 16 for further processing. Another bus 15 is then required to pass along the data from mixer 14 to CODEC 16.

Utilization of buses in a serial format, as depicted in FIG. 1A, has several limitations. A primary limitation of a serial configuration is that the buses may only be utilized for one purpose. As in FIG. 1A, bus 13 can only be used to transfer information from DMA 12 to mixer 14, and bus 15 may only be utilized to transfer information from mixer 14 to CODEC 16. Often times, routing of buses on circuit boards and/or integrated circuits require a large amount of space, generally a scarce commodity. Thus, having to have multiple buses in order to accommodate the data flow from DMA 12 to mixer 14 and then to CODEC 16 is non-optimal at best and prohibitively expensive in terms of board real estate.

Another problem with a serial bus configuration is synchronization. The data flow from DMA 12 to mixer 14 must be synchronized to ensure that mixer 14 receives data at an appropriate rate. Similarly, the data flow from mixer 14 to CODEC 16 must also be synchronized. If the integrated circuits 12, 14 and 16 are operating at different clock rates provisions must be made to ensure that the data rates over buses 13 and 15 accommodate the different clock rates of the integrated circuits. Furthermore, a final output of CODEC 16 is consequently delayed by a latency time period which is equivalent to the amount of processing time required by DMA 12, mixer 14, CODEC 16 and the time to transfer the data over buses 13 and 15.

The prior art bus configuration of FIG. 1A is a simplistic one. Now referring to FIGS. 1B and 1C, more complicated examples of serial bus configurations are depicted. FIG. 1B depicts a prior art configuration 20. The configuration includes a number of processing blocks or integrated circuits DMA 22, mixer 23, digital signal processor (DSP) 25, sample rate converter 27, mixer 29, and CODEC 33. Intercoupling the processing blocks are buses 24, 26, 28, 31, 32.

DMA 22 may wish to pass on information through bus 24 to either mixer 23 and sample rate converter 27. DMA 22 may then address the appropriate processing blocks in order to send data to either mixer 23 or sample rate converter 27 along bus 24. Accordingly, bus 24 would include an address bus and a data bus.

After mixer 23 or sample rate converter 27 have performed the necessary operations on the data provided by DMA 22 the data may be passed along to mixer 29 along bus 28 and bus 31, respectively. Since buses 28 and 31 only convey data from one source to one destination they may only include a data bus with appropriate control lines.

In order for mixer 29 to accomplish its necessary functions it may need to utilize a DSP 25. Mixer 29 communicates with DSP 25 over bus 26. Bus 26 typically includes an address bus and a data bus since a DSP may include a number of different address locations to be written to or read from. Finally the output of mixer 29 may them be sent to CODEC 33 across bus 32, which may only include a data bus and control lines.

As can be seen in FIG. 1B a large number of buses are required to transfer the appropriate data from DMA 22 to CODEC 33. All total, five buses are required in order to intercouple six processing blocks or integrated circuits. Only in one case is a bus capable of transferring information from more than one block to another, i.e., bus 24. However, bus 24 is still limited to unidirectional data flow. The other buses simply transfer data from one processing block to another, without being able to perform any other function. Furthermore, the buses are specifically synchronized to the processing blocks to which they are connected. At any one time buses 24, 26, 28, 31, and 32 may have been operating at different frequencies.

FIG. 1C is a prior art configuration 40 of another serial data flow configuration. Configuration 40 includes DMA 42, DMA 45, mixer 43, sample rate converter 48 and CODEC 49. The processing blocks are connected together by buses 50 through 53. In this particular configuration, data flows in a parallel path from DMA 42 to CODEC 49 and DMA 45 to CODEC 49.

Data from DMA 42 is passed along bus 50 to mixer 43 and then along bus 52 to CODEC 49. Data from DMA 45 is passed along bus 51 to sample rate converter 48 and bus 53 to CODEC 49. Again, the same problems exist in this configuration as in the configurations depicted in FIGS. 1A and 1B. The buses 50–53 may only be utilized to transfer data from one processing block to another, without modification or alterations to serve any other function. Also the buses 50–53 may be operating at different speeds. Thus, the output of CODEC 49 depends upon the different processing and data transfer rates along the two different data flow paths.

Another method of configuring processing blocks would be to utilize a parallel bus configuration, referring to FIG. 2.

FIG. 2 illustrates a parallel bus configuration 80. The configuration includes processing blocks, such as DSP 82, first-in-first-out (FIFO) memory 84, DMA 86, random access memory (RAM) 88, CODEC 90 and mixer 92. The processing blocks are connected together by a common bus 94. Bus 94 generally includes an address bus and a data bus since the bus must interconnect several addresses.

Configuration 80 may be utilized to simulate different types of flow, as depicted in FIGS. 1A–1C. To simulate the processing steps illustrated in FIG. 1A data may be moved from DMA 86 to RAM 88 and then to mixer 92, all transactions passing through bus 94. After mixer 92 has finished processing the data, it may then be moved to CODEC 90 through bus 94. With further processing blocks connected to bus 94 the processing steps depicted in FIGS. 1B and 1C may be also be performed utilizing a single bus 94. However, there are downsides to utilizing a single bus 94 to move all the data from a number of different processing blocks.

Typically, in order to utilize a single bus, for example, bus 94, RAM 88 is required. In the configurations depicted in FIGS. 1A–1C data is passed from one processing block to another one word, or sample, at a time. Data also constantly flows from one processing block to another. However, in configuration 80 data is passed along from one processing block to another in large blocks of data. This is because bus 94 may only be utilized to carry information from one source to one destination at any one point in time.

A processing block may have to wait its turn in order to transfer its data to another processing block while another processing block is currently using bus 94. RAM 88, therefore, is required in order to accommodate the flow of data from DMA 86 to the other processing blocks. DMA 86 may output data to RAM 88 where it is stored until bus 94 is available to transfer the data from RAM 88 to another processing block. Similarly, processing blocks 82, 90 and 92 may also require storage elements in order to buffer information in between data transfers. Therefore DSP 82, CODEC 90 and mixer 92 would typically have RAM included within those processing blocks. Additionally, FIFO 84 may be utilized to store data for processing blocks that may not have internal storage elements.

The asynchronous characteristics of parallel configuration 80 lead to several drawbacks. Primarily, processing blocks may require additional storage elements in order to utilize bus 94. Each processing block also compete for bus time. The processing blocks may need to undergo an elaborate procedure for gaining access to bus 94 in order to complete its data transfer transaction. At the same time, collisions may occur when more than one processing block accesses bus 94 at the same time.

Since large blocks of information are transferred over bus 94 at any one data transfer a high frequency clock rate is necessary for bus 94. As can be appreciated by those skilled in art, a high frequency clock rate often times presents many design and implementation problems. And, generally only a fixed clock rate may typically be implemented on bus 94. Thus again the processing blocks must be synchronized to the clock rate of bus 94 in order to properly communicate among other processing blocks.

Thus, what is desired is a common bus that may be utilized by a number of processing blocks, but where the processing blocks are not necessarily fixed to the clock rate of a common bus. That is, the processing blocks independently operate according to their particular clock rates and still be able to transfer data from one processing block to another. Furthermore, a common bus that may be programmed to allow a myriad number of different combinations of processing blocks to communicate together is desired.

SUMMARY OF THE INVENTION

The present inventions provide apparatuses and methods for implementing a programmable bus. A programmable bus provides greater functionality and versatility through the ability to manage data transfers according to a number of sample rate clocks. The number of processing components connected to the programmable bus may be varied without a significant amount of physical alternations. Also, the number of data transfers for a given number of processing components may be modified and scheduled accordingly by reprogramming the programmable bus.

In one embodiment the programmable bus comprises a bus and a bus arbiter. The bus is coupled to the bus arbiter and a plurality of devices. The plurality of devices operate at different sample rate clocks. The bus arbiter schedules and conducts the transfer of data between the plurality of devices according to the sample rate clocks such that the plurality of devices send and receive data at appropriate times, corresponding to the sample rate clocks. Thus, the bus arbiter is programmable due to the ability to configure the bus arbiter to schedule and conduct the transfer of data between and among the plurality of devices.

In another embodiment, the programmable bus further includes a source address bus, a destination bus and a data bus. The bus arbiter asserts a source address on the source address bus to identify a source device of the plurality of devices for a particular data transfer. The bus arbiter asserts a destination address on the destination address bus to identify a destination device of the plurality of devices for the particular data transfer. And, the source device provides a piece of data on the data bus and the destination device receives the piece of data from the data bus. In yet another embodiment, each processing component may have multiple channels. The bus arbiter may then assert destination and source addresses that include channel addresses.

In another embodiment, the programmable bus includes a sample rate bus. The sample rate bus includes a plurality of sample rate clock lines. Each of the sample rate clock lines carries a sample rate clock. The plurality of devices are also coupled to the sample rate bus and operate at different sample rate clocks. The programmable bus conducts data transfers between and among the plurality of devices according to the sample rate clocks.

In yet another embodiment, the plurality of devices include interface circuitry to allow them to interface properly with the programmable bus. Each device includes an input buffer and an output buffer, the input buffer having a first and a second buffer, and the output buffer having a first and a second buffer. The programmable bus is further comprised of a buffer select line carrying a buffer select signal, such that the buffer select signal informs the plurality of devices whether to use the first or the second buffer of the input and output buffers for the transfer of data. Double buffering facilitates, in one embodiment, the transfer of data based upon different sample rate clocks.

These and other advantages of the present invention will become apparent to those skilled in the art upon a reading of the following descriptions of the invention and a study of the several figures of the drawing.

BRIEF DESCRIPTION OF THE DRAWINGS

FIG. 10B illustrates a flowchart of an exemplary sequence of events related to a chain of data transfers A depicted in FIG. 10A in accordance with an embodiment of the present invention.

FIG. 10C illustrates the chain of data transfers B of FIG. 10A in accordance with an embodiment of the present invention.

DETAILED DESCRIPTION OF THE PRESENT INVENTION

The present inventions provide methods and apparatuses for providing a programmable bus. A programmable bus offers the flexibility of a common bus that may be utilized by multiple processing components within in a single integrated circuit, or a common bus for interconnecting multiple integrated circuits performing different functions. In addition to providing a common bus the present inventions allow for modularity among processing components such that a number of different processing components and/or integrated circuits may be mixed and matched with a single programmable bus.

A programmable bus, in accordance with the present inventions, may be utilized on any scale. By way of example, a programmable bus may be implemented on a printed circuit board to interconnect different integrated circuits, within a single integrated circuit intercoupling a number of processing components, or even to interconnect a number of computing devices that must share information with each other. In one embodiment, a programmable bus may be utilized within an audio processing chip employed on an audio processing card within a computer system.

Figure 1A:
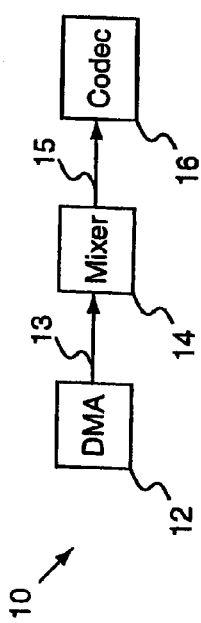
FIGS. 1A–C illustrate prior art serial bus configurations.
Figure 1B:
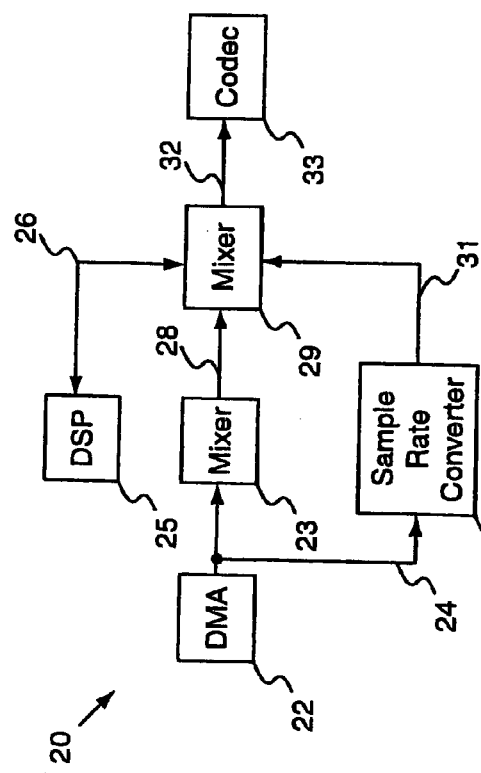
Figure 1C:
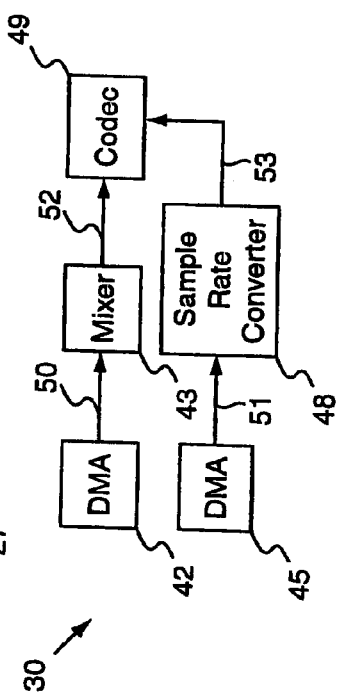
Figure 2:
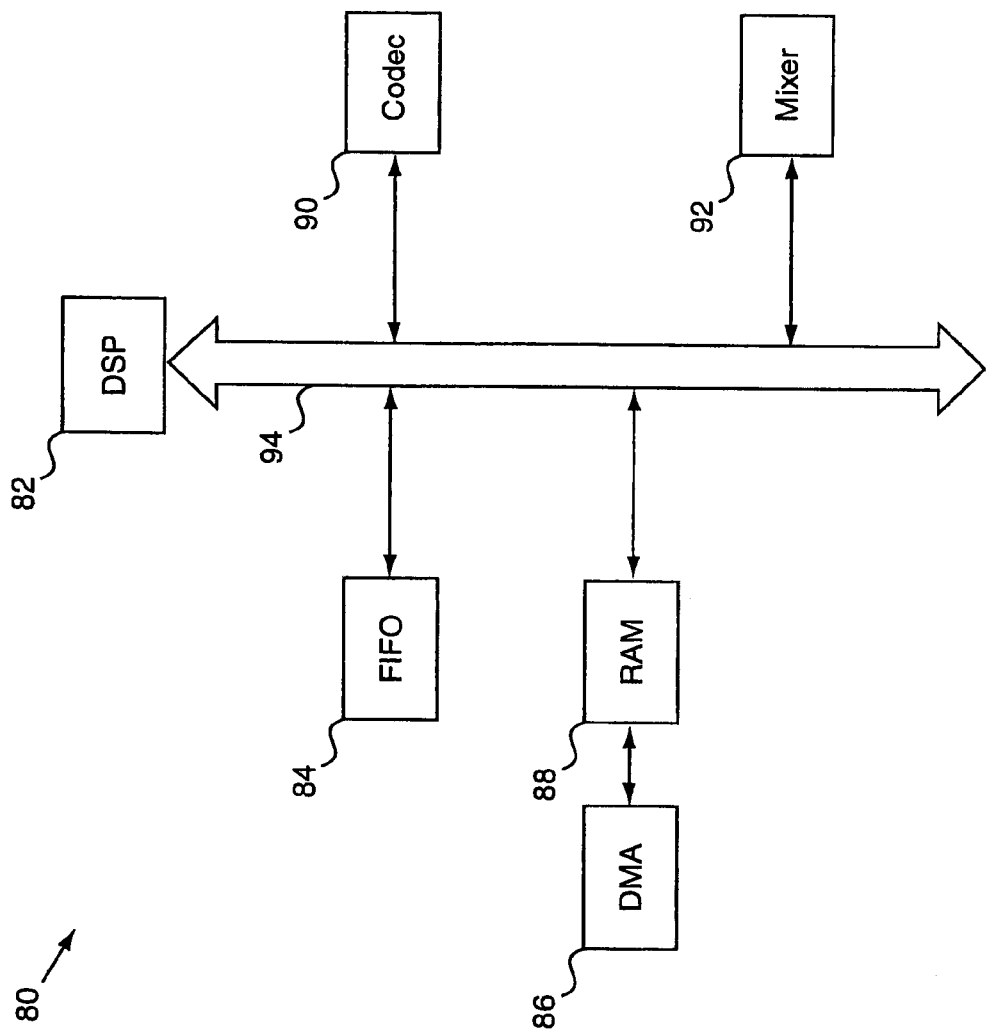
FIG. 2 illustrates a prior art parallel bus configuration.
Figure 3:
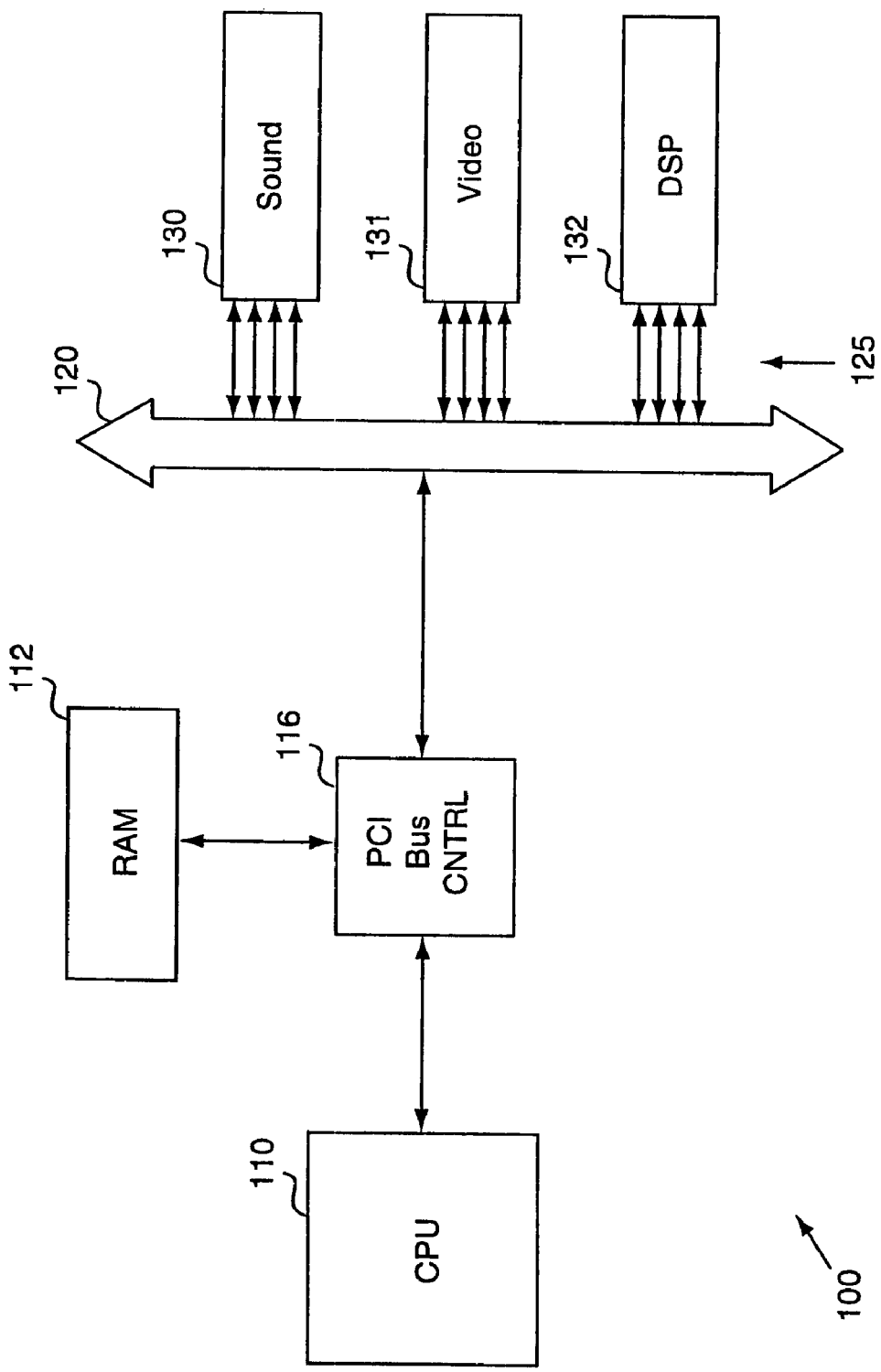
FIG. 3 illustrates a block diagram of a computer system including an audio processing card in accordance with an embodiment of the present invention.

FIG. 3 is a block diagram of a computer system 100 including an audio processing card 130 in accordance with an embodiment of the present invention. In the illustrated embodiment, computer system 100 includes a central processing unit (CPU) 110, a PCI bus controller 116 and random access memory (RAM) 112. Further included in computer system 100 are peripheral cards 130, 131 and 132. The CPU is intercoupled with the peripheral cards through a PCI bus 120 and multiple direct memory access channels 125. Multiple direct memory access channels 125 are described in further detail in co-pending U.S. patent application Ser. No. 09/082,312, entitled "Methods and Apparatuses For Managing Multiple Direct Memory Access Channels" by Shaham Parvin and Gary M. Catlin, filed concurrently herewith, now U.S. Pat. No. 6,167,465, which is incorporated herein by reference in its entirety.

In particular, peripheral card 130 may be an audio processing card. Audio processing card 130 may receive audio information from RAM 112 via bus 120 and PCI bus controller 116 through multiple direct memory access channels 125. The audio information is then received by an audio processing chip, now referring to FIG. 4.

Figure 4:
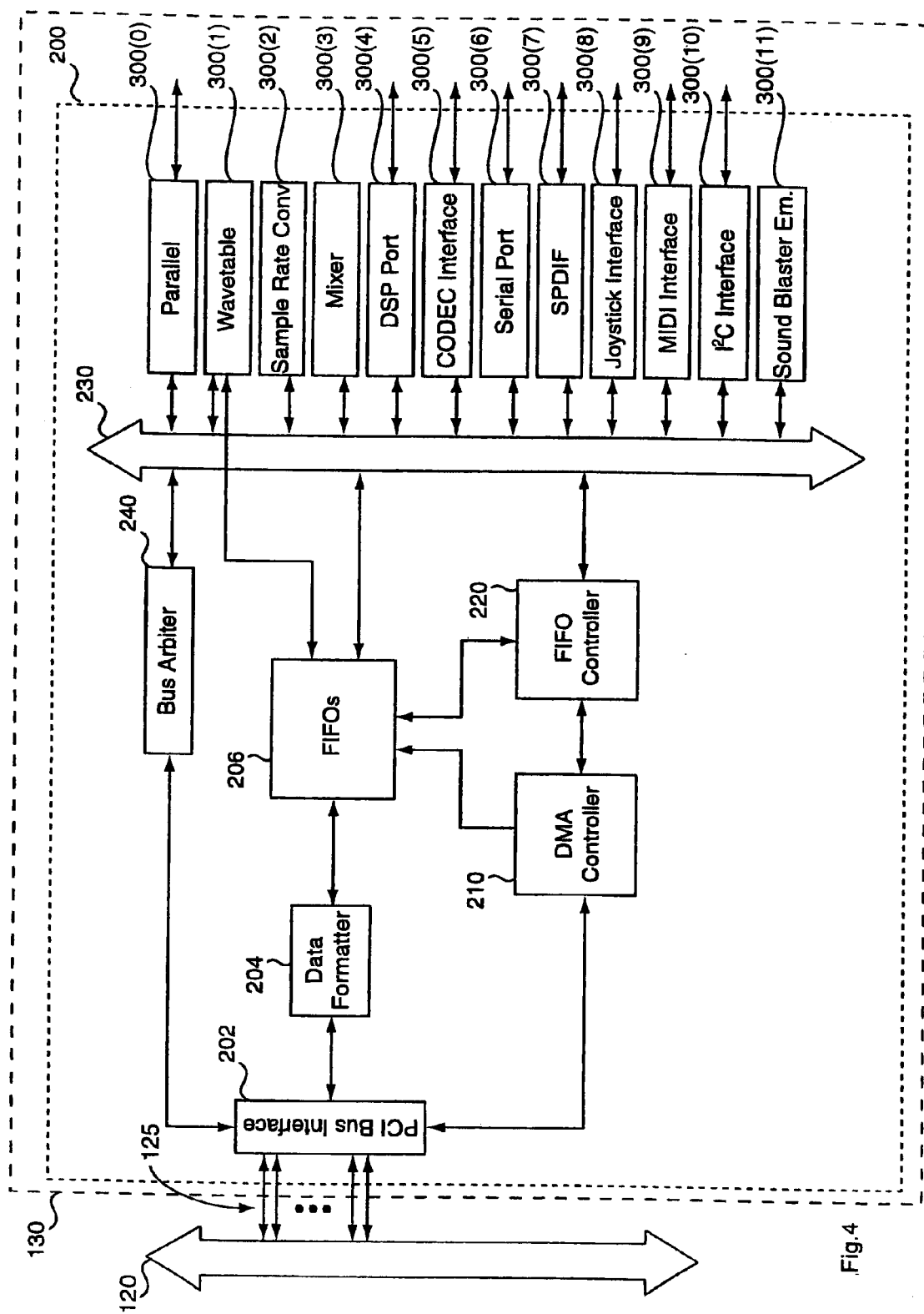
FIG. 4 illustrates a block diagram of an audio processing chip implemented on the audio processing card of FIG. 3.

FIG. 4 is a block diagram of an audio processing chip 200 implemented on audio processing card 130. Audio processing chip 200 receives audio data through multiple direct memory access channels 125. Audio processing chip 200 includes a PCI interface 202, a data formatter 204, a FIFO memory 206, a DMA controller 210 and a FIFO controller 220. The operation of those elements within audio processing chip 200 are discussed in further detail in the previously referenced co-pending application.

Elements 202, 204, 206, 210 and 220 enable audio processing chip 200 to receive data from RAM 112 of the computer system depicted in FIG. 3. Once audio data has been received from RAM 112 it may then be passed on to the appropriate processing component for processing and eventual output. The data is passed along to the processing components through a programmable bus 230. Programmable bus 230 is controlled by bus arbiter 240.

In the illustrated embodiment, programmable bus 230 may interconnect several processing components 300 (0)–300 (11). Programmable bus 230, in the particular embodiment, interconnects 12 processing components, FIFOs 206 and FIFO controller 220 However, the present invention may be applied to any suitable number of processing components.

By way of example, the processing components may include a parallel port interface 300(0), a wavetable 300(1), a sample rate converter 300(2), a mixer 300(3), a DSP port 300(4), a CODEC interface 300(5), a serial port interface 300(6), a Sony Phillips Digital Interface (SPDIF) 300(7), a joystick interface 300(8), a musical instrument digital interface (MIDI) 300(9), a Phillips I$^2$C interface 300(10), or a Sound Blaster emulator 300(11), or any other suitable processing component. Sound Blaster emulator 300(11) may be a frequency modulator emulator as described in co-pending U.S. application Ser. No. 08/893,148, entitled "METHOD AND APPARATUS FOR EMULATING A FREQUENCY MODULATION DEVICE", by Charles J. Cameron and Gary M. Catlin, filed Jul. 15, 1997, now U.S. Pat. No.

6,051,772, which is incorporated herein by reference in its entirety. In the illustrated embodiment, processing components related to audio processing are described, however suitable processing components for the applicable integrated circuits in which a programmable bus is utilized may be implemented.

Figure 5:
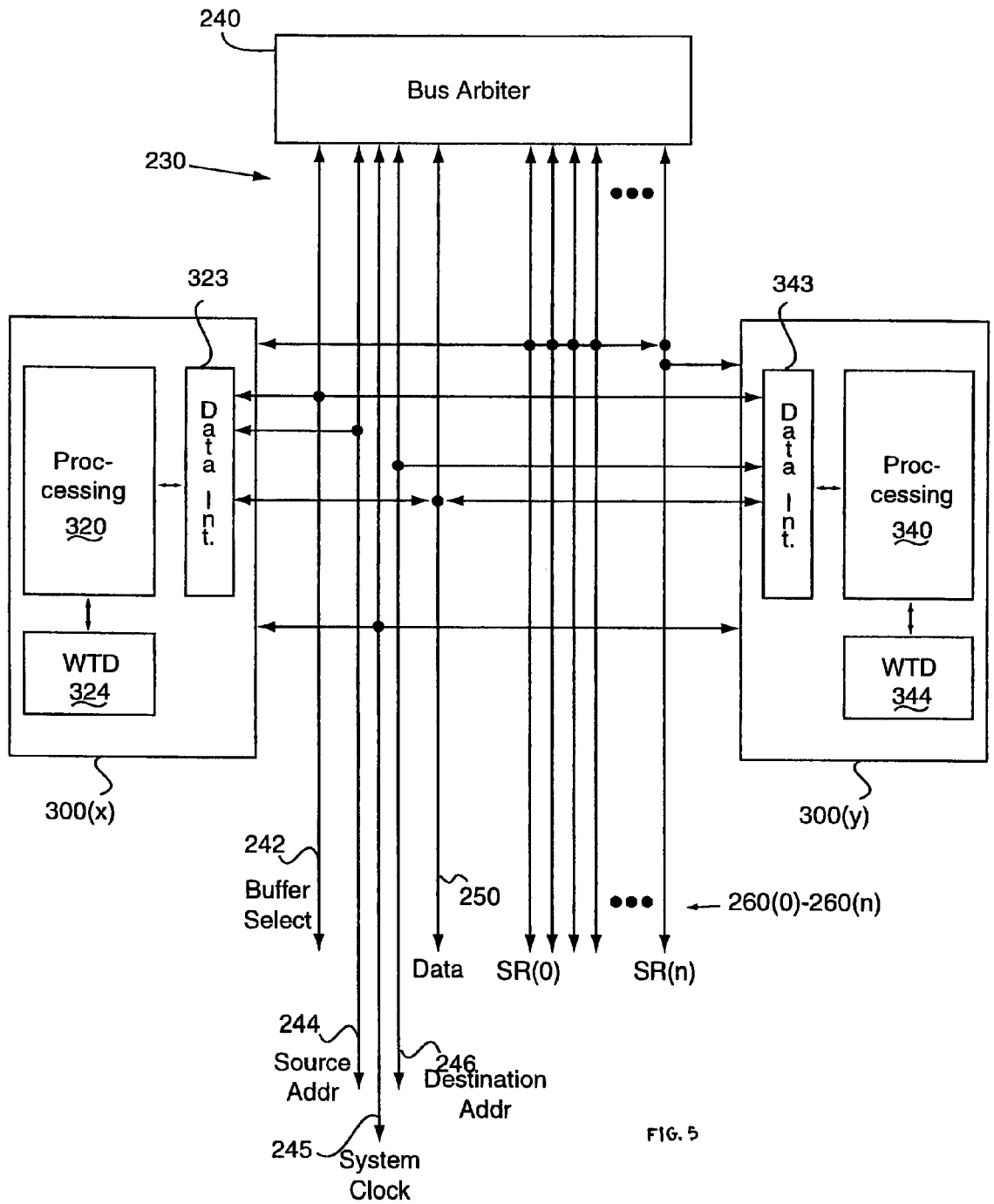
FIG. 5 is a block diagram of a programmable bus in accordance with an embodiment of the present inventions.

FIG. 5 is a block diagram of a programmable bus 230 in accordance with an embodiment of the present inventions. Programmable bus 230 is controlled by bus arbiter 240. Bus arbiter 240 provides a number of signals along programmable bus 230. The signals may include, in one embodiment, a buffer select signal 242, a source address bus 244, a system clock 245, a destination address bus 246, and a data bus 250. Programmable bus 230 may also include a number of sample rate clocks 260(0)–260(n). Sample rate clocks are clocks related to the sample rate periods required by the various processing components in order to operate properly on audio data. Sample rate clocks 260(0) through 260(n) are typically provided by the processing components, as discussed further.

Programmable bus 230 allows bus arbiter 240 to intercouple processing components 300(x) and 300(y). Processing components 300(x) and 300(y) are exemplary processing components symbolic of the types of processing components described earlier. For purposes of illustration the generic processing components will be described in further detail rather than describing any one type of processing component.

Programmable bus 230 includes buffer select signal 242 and a number of sample rate clocks 26(0)–260(n). System clock 245 and bus select 242 may be provided to all the processing components coupled to Programmable bus 230. However, some processing components need not utilize buffer select 242, as discussed further below.

System Clock 245 provides a common clock to all the processing components coupled to programmable bus 230 in order to synchronize operations. All the processing components coupled to programmable bus 230 are coupled to data bus 250. The data bus provides a pathway for data to be transferred from one processing component to another in conjunction with the address buses 244 and 246.

The sample rate clocks are either generated and/or received by the processing components coupled to programmable bus 230. Depending on the operations of each particular processing component, each processing component must operate at a certain sample rate. The sample rate dictates how fast a processing component must complete its operation in order to pass along data to another processing component, or for output, in a timely manner. By way of example, a processing component that is a sample rate converter may receive information from programmable bus 230 at a sample rate clock of 50 hertz. That is the data received by the sample rate converter must be processed within the next 50 hertz period. If the output of the sample rate converter is running at 80 hertz, then the sample rate converter must be able to convert a sample received at 50 hertz rate and output it at an 80 hertz rate.

The sample rate converter receives both a 50 hertz sample rate clock and a 80 hertz sample rate clock in order to synchronize its operations. One of the sample rate clocks, e.g. 260(3) may carry a 50 hertz clock, and another sample rate clock 260(5) may carry a 80 hertz clock. Both clocks are received and used by the sample rate converter.

The sample rate clocks utilized by the sample rate converter are normally generated by an external clock or clocks generated by the processing components providing to and/or receiving data from the sample rate converter. A sample rate converter may be a "master" or a "slave" to the other processing components with which the sample rate converter is operating in conjunction.

A master is a processing component which provides a sample rate clock. A slave is a processing component that receives a sample rate clock. The slave is "slaved" to the particular sample rate clock it is receiving, while the "master" dictates its operating speed and the speed of the corresponding slave receiving the sample rate clock and associated data.

Depending upon whether the processing component is a master or a slave, the processing component may be connected to one or more sample rate clocks. In one embodiment, if the processing component is a master the processing component may be assigned to one particular sample rate clock, e.g., sample rate clock 260(4). In such a configuration, several processing components that are masters are assigned their own individual sample rate clock lines 260(0)–(n). In another embodiment, a processing component may be connected to several different sample rate clock lines to provide additional flexibility with regard to the assignment of sample rate clocks to the particular sample rate clock lines.

If the processing component is a slave, the processing component may be connected one or several sample rate clock lines. If the slave processing component is a slave that is dedicated to one particular master processing clock, they can share one common sample rate clock. However, if the slave processing component is capable of functioning with several different processing components, the slave processing component is preferably connected with all the sample rate clock lines associated with those master processing components.

Returning to the example of a sample rate converter, the sample rate converter may be a slave in terms of the sample rate at which it receives data. However, the sample rate converter may be driving an output device at an output sample rate. The sample rate converter is the master of the output data and sample rate. Other processing components may be a master, a slave, or both, depending upon the type of operations performed by the processing component.

In the illustrated embodiment processing component 300 (x) is a master/slave processing component connected to all of the sample rate clock lines 260(0)–(n). Processing component 300(y) is a slave processing component receiving all of the sample rate clock lines. The processing components 300(x) and 300(y) share at least one common sample rate clock line, e.g., 260(n). The processing components may share more than one sample rate clock line if they are able to operate at different sample rate clock frequencies.

Sample rate clocks, thereby, dictate the frequency at which processing components communicate with each other. In one aspect of the present inventions, a programmable bus provides communications between processing components to take place on a per sample basis, similar to serially configure buses. At the same time, a programmable bus enables communication between many different processing components. Thus, in one embodiment, the present inventions provide the best of serial and parallel configurations.

Communications between several different processing components is accomplished by having arbiter 240 control the flow of data from one processing component to another. Programmable bus 230 has two address buses 244 and 246 to allow bus arbiter 240 to control the flow of data to and from different processing components. Typically, prior art data buses only included one address bus since direct communication between separate processing components that did not control the data bus was not generally possible.

Source address bus 244 and destination address bus 246 are generated by bus arbiter 240. Bus arbiter 240 controls the flow of information from one processing component to another by generating the source and destination addresses. For example, in order to transfer data from processing component 300(x) to processing component 300(y) the bus arbiter generates the address for processing component 300(x) on the source address bus (i.e., the source of the data) and generates the address for processing component 300(y) on the destination address (i.e., the destination of the data).

Processing component 300(x) includes processing circuitry 320, a data interface 323, and a work-to-do block 324. Processing component 300(y) similarly includes processing circuitry 340, data interface 343 and a work-to-do block 344. Processing circuitry 320 and 340 provide the specific functionality required by the particular processing component. By way of example processing circuitry 320 may be particularly suited for a mixer type processing component, and processing circuitry 340 may be particularly suited for a CODEC processing component. However, any type of processing component, and therefore any type of processing circuitry, may be accommodated by a programmable bus in accordance with the present inventions.

Data interfaces 323 and 343 allow the arbiter to write to and read from the processing components through programmable bus 230. The data interfaces are synchronized with the system clock 245, which is generated by arbiter 240 Using a common system clock, the arbiter simultaneously generates source and destination addresses in order to move data from one processing component to another.

Another feature of the present inventions is the modularity of data interfaces utilized in order to provide access to programmable bus 230. Each data interface for the processing components are substantially the same in functionality, except possibly for the address spaces. This enables the arbiter to synchronously transfer data from one processing component to another.

Figure 6:
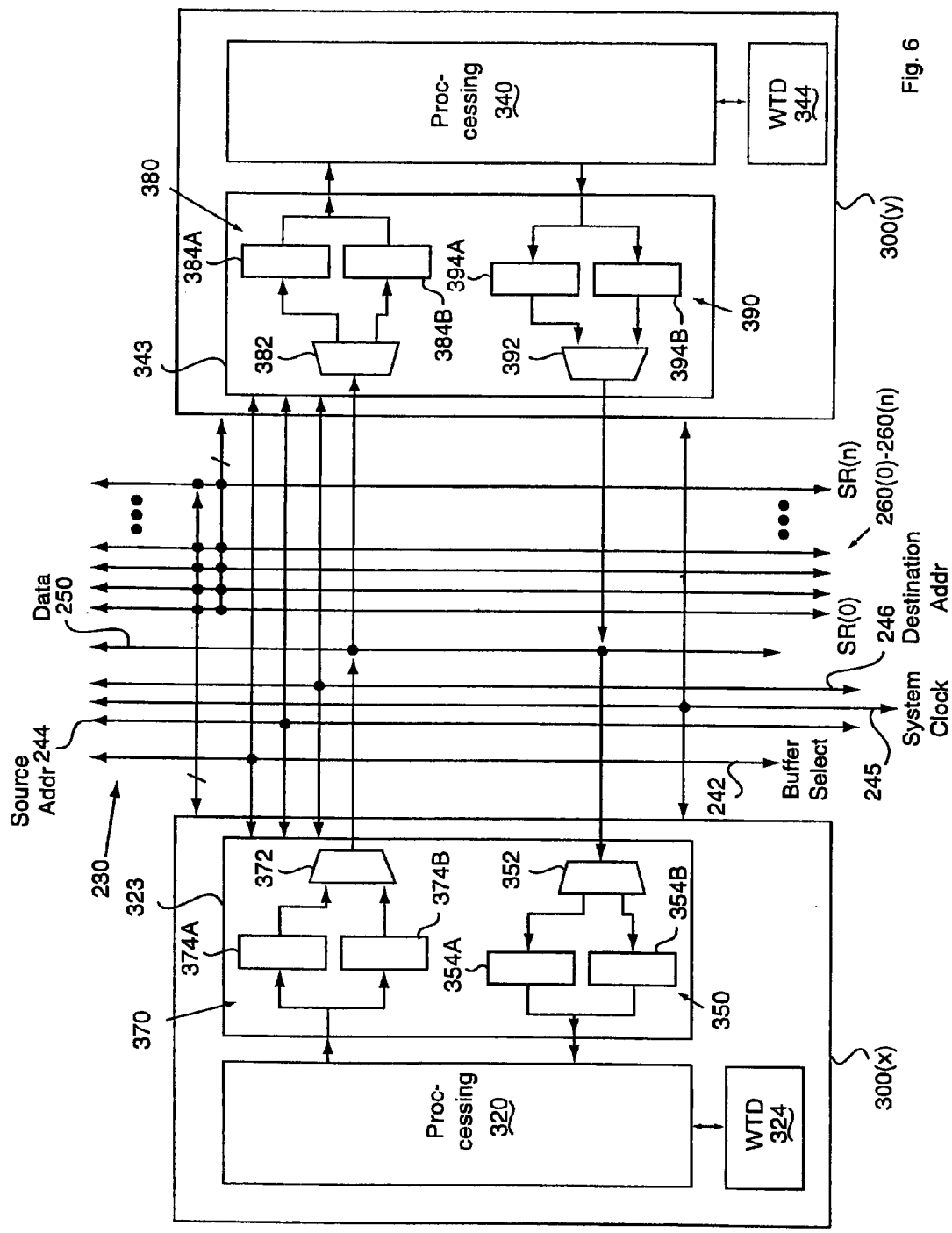
FIG. 6 illustrates a representational block diagram of the processing components and data interfaces depicted in FIG. 5 in accordance with one embodiment of the present inventions.

Referring to FIG. 6, the operations of data interfaces 323 and 343 in conjunction with bus arbiter 240 are discussed in further detail. FIG. 6 is a representational block diagram of processing components 300(x) and 300(y) and data interfaces 323 and 343 in accordance with one embodiment of the present inventions. Data interface 323 includes input circuitry 350 and output circuitry 370. Similarly, data interface 343 includes input circuitry 380 and output circuitry 390. In another embodiment, a processing component may only provide or receive data and not both. In such a case the data interface of that processing component may have only an input or output circuitry.

The data interfaces receives or provides information to or from data bus 250. The input or output circuitry interacts with the data bus dependent upon the receipt of the correct address from the source or destination address buses. A processing component capable of receiving and generating data is coupled to both source address bus 244 and destination address bus 246. Additionally, the processing component may be connected to buffer select signal 242.

Arbiter 240 also receives all the sample rate clock lines 260(0)–(n). The arbiter synchronizes the transfer of data between processing components 300(x) and 300(y) based upon the sample rate clock line 260(n) shared by the processing components 300(x) and 300(y). Arbiter 240 generates the appropriate source and destination addresses on buses 244 and 246, respectively. The source address is received by input circuitry 350 and 380 of the processing blocks. The destination address is received by the output circuitry 370 and 390 of the processing blocks.

The source and destination addresses are generated according to the sample rate clock line shared by the processing blocks, in the particular example sample rate clock line 260(n). If the sample rate clock frequency is 100 hertz, the arbiter schedules and conducts a data transfer between the processing blocks every 100 hertz, or any other suitable multiple or increment of 100 hertz.

In one embodiment, the input and output circuitries of the processing components may be double buffered in order to provide the ability to synchronously transfer one piece of data while allowing the processing circuitries to operate on another piece of data. Input and output circuitries include buffers 354A, 354B, 374A, 374B, 384A, 384B, 394A and 394B. Input or output from the data bus to the buffers are channeled through multiplexers 352, 372, 382 and 392. Buffer select 242 may be used by the processing components to designate either the A buffers or the B buffers for the particular transaction. In another embodiment, the processing components may individually keep track of which set of buffers are being written to or read from.

Data interfaces 323 and 343 are representational of a double buffered scheme. Many different types of buffering techniques may accomplish the double buffering scheme of the present inventions. By way of example, a first-in-first-out (FIFO) memory may be used rather than buffers and multiplexers. Random access memory may also be substituted in place of the circuitry described. One particular embodiment of double buffering is described in further detail in reference to FIGS. 11 and 12.

Figure 7:
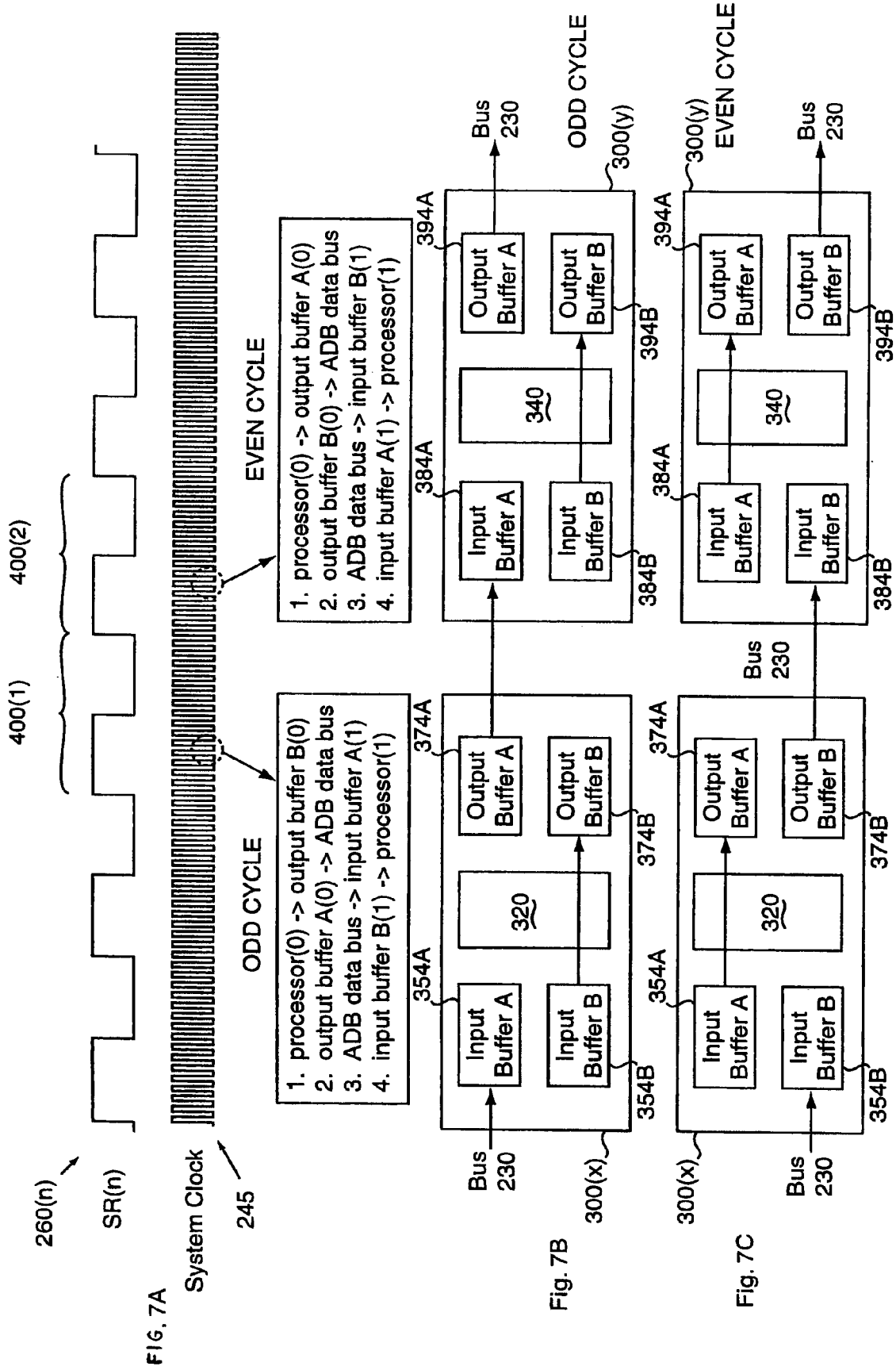
FIG. 7A illustrates a timing diagram of a system clock and a sample rate clock in accordance with an embodiment of the present inventions.
FIG. 7B illustrates the flow of data between two processing components during an odd cycle in accordance with an embodiment of the present inventions.
FIG. 7C illustrates the flow of data between two processing components during an even cycle in accordance with an embodiment of the present invention.

FIGS. 7A, 7B and 7C illustrate the timing of the operations of the processing blocks of FIG. 6 during a data transfer in accordance with an embodiment of the present inventions. FIG. 7A is a timing diagram of the system clock, and sample rate clock line 260(n). In one embodiment system clock 245 is some multiple frequency of sample rate clock line 260(n). For example, sample rate clock line 260(7) may be 100 hertz and system clock 245 may be 100 kilohertz. For each cycle of sample rate clock 260(7) system clock 245 would cycle 1000 times.

During the one thousand cycles of system clock per cycle of sample rate clock 260(n) arbiter 240 would perform a data transfer from processing block 300(x) to 300(y). During even cycles of sample rate clock 260(n) arbiter 240 performs a data transfer using one set of the double buffers of the input and output circuitries of the processing components, e.g., during even cycle 400(2). During an odd cycle, e.g., 400(1), the arbiter performs a data transfer using the other set of double buffers.

In one embodiment, the arbiter transfers data among the A buffers between processing components during an odd sample rate clock cycle. FIG. 7B illustrates the flow of data from processing component 300(x) to processing component 300(y) during an odd cycle in accordance to one embodiment of the present inventions.

Referring to both FIGS. 7A and 7B, arbiter 240 generates the source address for output buffer 374A of processing component 300(x) and the destination address for input buffer 384A of processing component 300(y) on the appropriate address buses. A first piece of data is thereby transferred from output buffer 374A to input buffer 384A. This transfer is completed during one of the thousand system clock cycles within an odd sample rate clock cycle 400(1).

Other events may occur during that same odd clock cycle 400(1). For example, if processing component 300(x) is receiving data from another processing component data is written to input buffer 354A. Also, if processing component 300(y) is sending data to another processing component, it provides data to the data bus from output buffer 394A. Of course, those transactions occur during different cycles of the system clock, but within the same odd sample rate clock cycle 400(1).

During the odd sample rate clock cycle 400(1) all the A buffers are utilized for transactions with the data bus. The B buffers, meanwhile, are used to provide and receive data from the processing circuitries of the processing components. This allows the processing components to continually process one piece of data while receiving/providing another piece of information from/to programmable bus 230.

Within the odd sample rate clock cycle the processing components are operating on the data held within their respective input buffers. For example, processing circuitry 320 of processing component 300(x) operates on the data stored within input buffer 354B. By the end of odd sample rate clock cycle 400(1) processing component 300(x) has completed its particular functions upon the data. The processed data is written to output buffer 374B before the end of the odd sample rate clock cycle. Processing circuitry 340 of processing component 300(y) similarly processes the data in input buffer 384B and writes the processed data to output buffer 394B.

FIG. 7C illustrates the flow of data from processing component 300(x) to processing component(y) during an even sample in accordance with an embodiment of the present invention. During even sample rate clock cycle 400(2) the B buffers are used for swapping data between processing components while the processing circuitries of the processing components utilize the A buffers for processing. The processing components receive the benefits of serial processing provided by serial buses, and at the same time the processing components receive the multi-point data exchange capabilities of a parallel buses.

The previous discussion is exemplary of a single data transaction between two processing components. The functional operations may be extended to several different data transactions occurring at different system clock cycles within a single sample rate clock cycle. By way of example, processing components 300(x) and 300(y) may have the capability to process several channels of data streams at any given time. The operations may be performed for each channel; each data transfer occurring within a single sample rate clock cycle.

For example, if the system clock is operating at 100 kilohertz and the sample rate clock frequency is 100 hertz, the arbiter is capable of completing up to 1000 data transfers between the processing components. Thus, a thousand channels may be accommodated by the processing components and the arbiter. In more practical situations, there are less than 1000 channels per processing component. Instead a large number of processing components with fewer channels may be accommodated in one embodiment of the present inventions.

The large number of processing components, however, are operating at different sample rate clock frequencies. Therefore, it is necessary to appropriately schedule the different data transfers according to sample rate clock frequencies, as discussed in further detail below.

Figure 8:
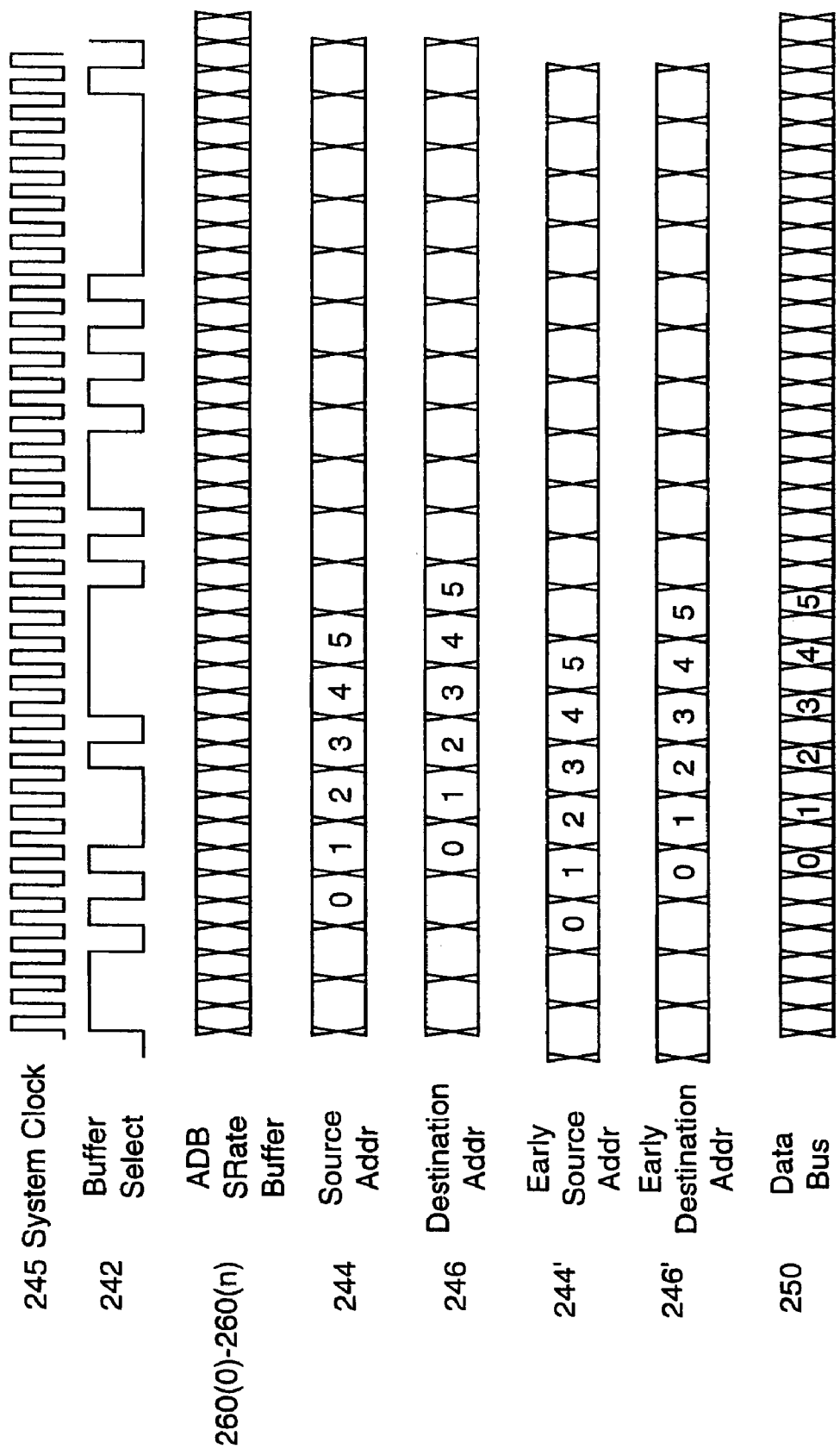
FIG. 8 illustrates a timing chart of a sample data transfer between two processing components in accordance with an embodiment of the present inventions.

In another embodiment, the arbiter performs a data transfer every two system clock cycles. The use of multiple system clock cycles for a single data transfer may be preferred to ensure synchronization. FIG. 8 is a timing chart of a sample data transfer between two processing components in accordance with an embodiment of the present inventions. The timing chart includes timing charts of system clock 245, buffer select 242, sample rate clock lines 260(0)–260(n) shown in the form of a word value, source address 244, destination address 246 and data bus 250. In the particular embodiment, programmable bus 230 also includes an early source address bus 244' and an early destination address bus 246'.

In the illustrated embodiment of FIG. 8 a single data transfer requires two cycles of the system clock. Bus arbiter 240 begins a transaction by providing source address 244. Two cycles later bus arbiter 240 provides destination address 246. The states of the source and destination addresses are enumerated, similarly numbered states corresponding to a single data transfer.

The source and destination addresses are held for two cycles to allow the processing components to directly access their double buffers without the need for a separate register. However, in an embodiment where speed is crucial registers may be added to the processing components and the address can be held for a single cycle or extended over more cycles.

A single transaction takes place over the span of four cycles in the illustrated embodiment, but since data transfers are pipelined the effective time requirement for a single data transfer is two cycles. Again, in an alternative embodiment the effective time for a single data transfer may be reduced to a single system clock cycle.

The illustrated embodiment also utilizes early addresses. Bus arbiter 240 provides early source address 244' and early destination address 246' to accommodate different types of input and output circuitries. In an embodiment utilizing RAM as interface circuitries (e.g., 323 and 343 of FIG. 6) early addressing may be required to allow enough time to access the correct address locations in the RAM. Bus arbiter 240 asserts the early addresses in advance of the ordinary addresses. The amount of advance may be varied to allow suitable time for the processing components to effectively use the early addresses.

Bus arbiter 240 also provides buffer select 242 to the processing components. Buffer select 242 is valid for a data transfer during the same period source address 244 is valid for the data transfer. The generation of buffer select 242 and its characteristics are described in further detail in reference to FIG. 9.

Figure 9:
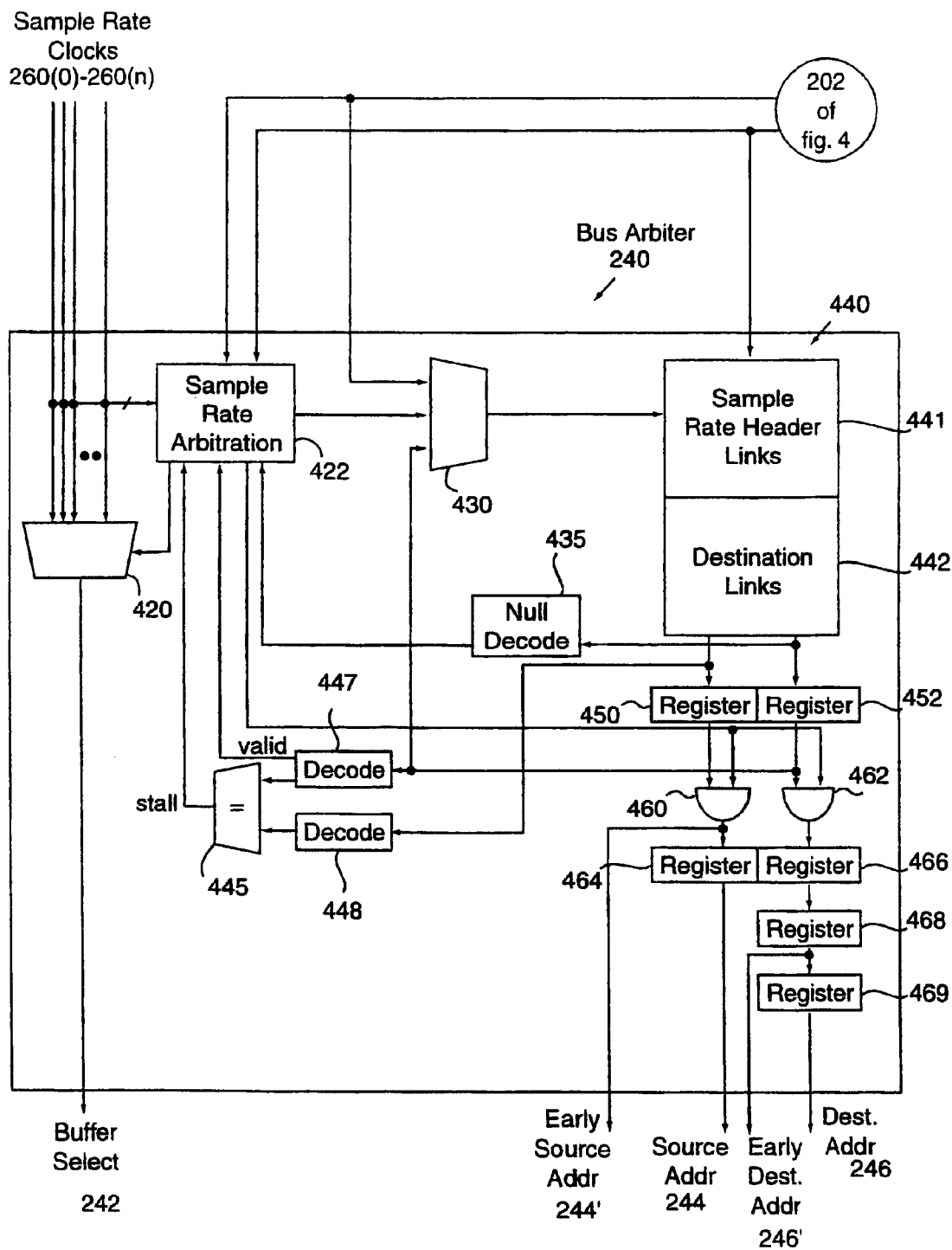
FIG. 9 is a block diagram of the bus arbiter of FIG. 4 in accordance with an embodiment of the present inventions.

FIG. 9 is a block diagram of bus arbiter 240 of FIG. 4 in accordance with an embodiment of the present inventions. Bus arbiter 240 controls the transfer of data from one processing component to another by generating the early source address, source address, early destination address, destination address and buffer select signals. In alternate embodiments, the bus arbiter may generate additional signals that facilitate the transfer of data.

Bus arbiter 240 includes circuitry for generating the appropriate signals. The signals are generated based upon sample rate clocks 260(0)–(n). Buffer select 242 is one of the signals generated from the sample rate clocks. Buffer select 242 is typically a clock with a half duty cycle, or half the frequency, of the particular sample rate clock being utilized. Buffer select provides information to the processing components as to which set of double buffers are being used for a data transfer, and which set of double buffers are being used for processing. The functions of the double buffers swap every cycle of a particular sample rate clock. Thus, in one embodiment, the buffer select signal may be a clock with half the frequency of the particular sample rate clock being used. Similarly, buffer select signal may be the same frequency of the sample rate clock and the processing component may detect the transitions of the buffer select signal to determine the proper selection of the double buffers.

In one embodiment a buffer select signal may be generated for each sample rate clock, each processing component receiving the appropriate buffer select signal corresponding to the sample rate clock used by the particular processing component. More preferably, a single buffer select signal may be generated that is applicable to all the sample rate clocks. Buffer select signal 242 may be a time division multiplexed signal of all the sample rate clocks, but at half the frequencies of the sample rate clocks.

Alternatively, each processing component may internally keep a buffer select signal that is toggled by the corresponding sample rate clock. A sample rate clock includes two types of information, information based upon transitions, or edges, and information based upon states. Based upon the state and transitions of the sample rate clock a processing component is capable of determining which double buffer should be used for transferring data and which double buffer should be involved in processing data.

Bus arbiter 240 includes a multiplexer 420 and a sample rate arbiter 422. Multiplexer 420 receives all sample rate clocks 260(0)–(n). Sample rate arbiter 422 determines upon which of the sample rate clocks 260(0)–(n) the present data transfer depends. The sample rate arbitrator chooses a particular sample rate clock based upon information received from within the bus arbiter, as discussed further below, or the particular sample rate clock is chosen directly. Direct selection may be performed, in one embodiment, by programming the sample rate arbiter 422 to select a particular sample rate clock through bus interface 202 of FIG. 4.

In the illustrated embodiment, sample rate arbiter 422 may select one of sample rate clocks 260(0)–(n) based upon information obtained from other portions of the bus arbiter. The sample rate arbiter makes a selection for each data transfer, which may take place over one or more cycles of system clock 245. Buffer select signal 242 is, thereby, a time division multiplexed signal incorporating all the halved frequencies of the sample rate clocks.

The bus arbiter further includes a work-to-do RAM 440, a null decoder 435, a multiplexer 430, a stall decoder 445, decoders 447 and 448, and gates 460 and 462 and registers 450, 452, 464, 466, 468 and 469. The choice of the particular sample rate clock is driven primarily by sample rate arbiter 422. Work-to-do RAM 440 is used by the sample rate arbiter 442 to keep track of the data transfers that must be completed within the appropriate cycle of the sample rate clocks.

Sample rate arbiter 422 also schedules the data transfers. Sample rate arbiter 422 informs the work-to-do RAM how many sample rate clocks are active. At the start of each new cycle of each sample rate clock 260(0)–(n), the sample rate arbiter initiates the data transfers that must be performed within the cycles of the sample rate clocks. The sample rate arbiter schedules the data transfers in conjunction with work-to-do RAM 440. Scheduling is further described with reference to FIG. 10A.

In cases where two sample rate clocks trigger at the same time the sample rate arbiter 422 determines which sample rate clock to service first. The other sample rate clock is delayed until the transactions related to the first sample rate clock are completed. The decision, in one embodiment, may be based upon any suitable priority scheme. Additionally, all the sample rate clocks may be prioritized by the sample rate arbiter 422.

Figure 10A:
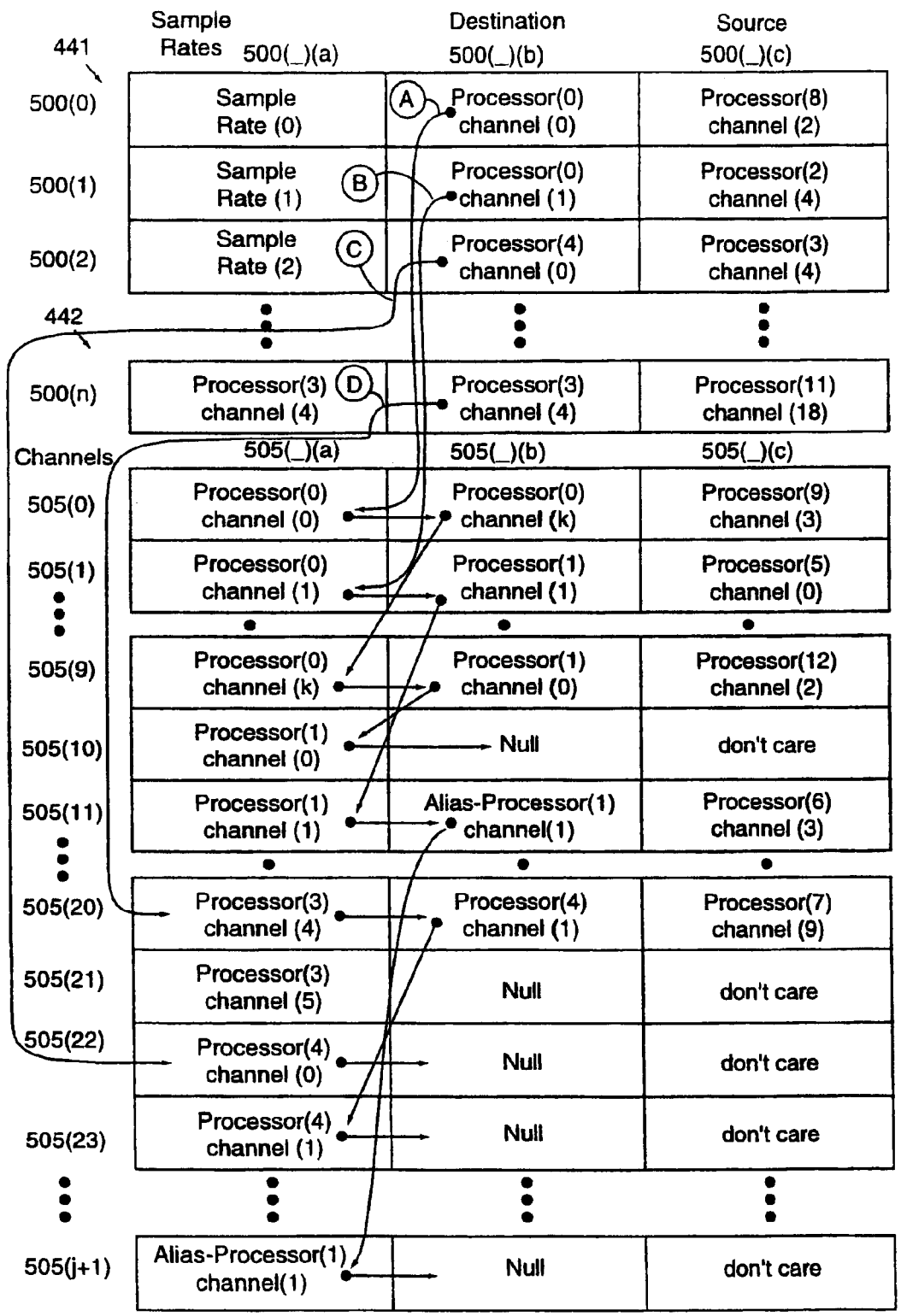
FIG. 10A illustrates a method of scheduling data transfers in accordance with an embodiment of the present invention.

FIG. 10A illustrates a method of scheduling data transfers in accordance with an embodiment of the present invention. Work-to-do RAM 440 includes a sample rate header links locations 441 and destination links locations 442. Sample rate header links locations 441 includes a number of sample rate headers 500(0)–(n). The number of sample rate headers 500(0)–(n) is equal to the number of sample rate clocks 260(0)–(n) that are active.

Each sample rate header is a header for a chain of data transfers that must be accomplished within a cycle of the particular sample rate clock. Each sample rate header includes a sample rate address (e.g., 500(0)(a)), a destination address (e.g., 500(0)(b)) and a source address (e.g., 500(0)(c)).

Destination links locations 442 include a number of destination links 505(0)–(j). The destination links includes the destination and source addresses for all the data transactions within a chain, other than the first. The number of destination links, j, is equal to the number of channels utilized by all the processing components. For example, if ten processing components each require five channels, there would be fifty destination links.

Each destination links 505(0)–(j) includes a next transfer address (e.g., 505(0)(a)), a destination address (e.g., 505(0)(b)) and a source address (e.g., 505(0)(c)). The destination addresses of both sample rate headers 500(0)–(n) and destination links 505(0)–(j) correspond not only to source address 244 that must be generated, they also correspond to the next transfer address. The work-to-do RAM generates the destination address 246 and uses it to proceed to the next destination link. This system removes the need for a separate destination address and a next transfer address in each sample rate header or destination link, and minimizes their word sizes.

When a new cycle of a particular sample rate clock begins the sample rate arbiter initiates a chain of data transfers. For purposes of illustration, the transition of sample rate clock 260(0) will be used. The sample rate arbiter initiates the chain of data transfers that must be completed within a cycle of sample rate clock 260(0) by pointing to the appropriate sample rate header, in this case 500(0). Sample rate address 500(0)(a) contains the address for the processor and channel that requires a transaction. In the particular embodiment, channel(0) of processor 300(0) is scheduled as the destination for the first data transfer of sample rate clock 260(0).

The sample rate address is also the same as destination address 500(0)(b). Destination address 500(0)(b) and source address 500(0)(c) contain the addresses for the first data transfer. When sample rate arbiter 422 points to sample rate header 500(0) work-to-do RAM 440 outputs destination address 500(0)(b) and source address 500(0)(c).

The destination address 500(0)(b) is then used as a vector to a next transfer address. In the illustrated embodiment, the next transfer address is 505(0)(a) of destination link 505(0). The data held in the next transfer address is the destination address 505(0)(b) and source address 505(0)(c), containing the addresses of the next data transfer. Work-to-do RAM outputs destination address 505(0)(b) and source address 505(0)(c) on programmable bus 230 to perform the next data transfer. Work-to-do RAM uses destination address 505(0)(b) to vector to another next transfer address, in the exemplary embodiment 505(9)(a).

To further illustrate a chain of data transfers, the chain of data transfers beginning at header link 500(0) proceeds as illustrated in FIG. 10B. FIG. 10B is a flowchart of an exemplary sequence of events related to a chain of data transfers A depicted in FIG. 10A. Initially, sample rate arbiter 422 detects a transition in sample rate clock 260(0) in block 550.

In the exemplary embodiment sample rate clock 260(0) has the highest priority. The priorities of the other sample rate clocks descending from sample rate clock 260(0) to 260(n). In alternate embodiments priorities may be assigned in any suitable order. In one embodiment the priorities are assigned according to the frequencies of the sample rate clocks; the highest frequency sample rate clock receives the highest priority and the lowest frequency sample rate clock receives the lowest priority. Intuitively, such an ordering is beneficial since events tied to sample rate clocks with higher frequencies must be performed more quickly than events tied to sample rate clocks with lower frequencies.

In yet another embodiment the priorities may be assigned according to frequency and the number of events tied to a certain frequency. For example, the number of events tied to a particular sample rate clock may exceed the practical number of events that may be accomplished within a sample rate cycle unless the sample rate clock is assigned a higher priority. In that case the priority of the particular sample rate clock may be upgraded.

In one situation the sample rate arbiter may preempt one sample rate clock in order to facilitate another sample rate clock. Two sample rate clocks may have ten transactions associated with each. Assuming the system clock is 10 kilohertz, one sample rate clock may be 1 kilohertz and the other may be 100 hertz. A hundred transactions may be scheduled for the 100 hertz sample rate clock, and ten transactions may be scheduled for the 1 kilohertz sample rate clock. The 1 kilohertz sample rate clock may trigger when the transactions of the 100 hertz sample rate clock is in progress. However, since the 1 kilohertz sample rate clock is fully scheduled any delay would mean that one or more of those transactions will not be accomplished.

The sample rate arbiter 422 may preempt the 100 hertz transactions and delay those transaction until the 1 kilohertz transactions are completed. The sample rate arbiter 422 gives priority to the 1 kilohertz sample rate clock in order to avoid not performing those transactions. Once the 1 kilohertz transactions are completed the sample rate arbiter 422 returns to the 100 hertz transactions.

In block 551, the sample rate arbiter points the work-to-do RAM to header link 500(0), the first event associated with sample rate clock 260(0). Based on the information in header link 500(0), in block 552, the work-to-do RAM outputs the appropriate addresses to perform a data transfer from channel(2) of processing component 300(8) to channel (0) of processing component 300(0). In block 553 work-to-do RAM 440 vectors to destination link 505(0) and outputs the addresses to transfer data from channel(3) of processing component 300(9) to channel(k) of processing component 300(0), where k is the number of channels available in processing component 300(0). Work-to-do RAM 440 then vectors to destination link 505(9), in block 554, and outputs the addresses to transfer data from channel(2) of processing component 300(12) to channel(0) of processing component 300(1).

After the final data transfer in chain A the work-to-do RAM points to a null address in block 555. Referring back to FIG. 9, a null address signals the sample rate arbiter that the work-to-do RAM has reached the end of a chain of data transfers. Null decoder 435 decodes the null address from the destination address output of the work-to-do RAM. The null decoder 435 generates a null signal to the sample rate arbiter upon receiving a null address from the work-to-do RAM. The work-to-do RAM ceases outputting addresses until the sample rate arbiter has initiated a new chain of data transfers.

In block 556, the sample rate arbiter proceeds to the next sample rate clock in priority. If the next sample rate clock is not active, i.e., there are no events scheduled for that sample rate clock, the sample rate arbiter proceeds to the next sample rate clock. In one embodiment the next sample rate clock is the sample rate clock next in priority. In another embodiment the next sample rate clock may be the highest priority sample rate clock that has not been serviced.

FIG. 10C illustrates a data transfer chain B of FIG. 10A in accordance with one embodiment. Blocks 560, 561, 565 and 566 are similar to blocks 550, 551, 555 and 556 of FIG. 10B and will not be discussed in further detail.

Once the work-to-do RAM has vectored to header link 500(1) in block 561, the work-to-do RAM outputs the addresses to perform a data transfer from channel(4) of processing component 300(2) to channel(1) of processing component 300(0) in block 562. Note that processing component 300(0) is operating at different sample rate clocks for different channels—channel(0) and channel(k) operating at sample rate clock 260(0), and channel(1) operating at sample rate clock 260(1).

In one embodiment destination links 442 includes a single destination link 505(0)–(j) for each channel of each processing component. Having only one destination link 505(0)–(j) for each separate channel avoids the problem of accidentally writing to the same channel twice in a single sample rate cycle.

However, in some situations it may be preferred to be able to write to a single channel more than once per sample rate cycle. For example, stereophonic channels require two words or samples of data per sample rate cycle, requiring two writes to the same channel.

By way of example, channel(1) of processing component 300(1) may be a stereo channel. The source of the data need not be the same, as in the illustrated example. Since only one destination link exists for each channel, an alias may be used to add an additional destination link for a particular channel. In the illustrated example destination link 505(j+1) is an alias to channel(1) of processing component 300(1).

In blocks 563 and 564 work-to-do RAM performs a data transfer from two sources to a single destination within the same sample rate clock cycle. Work-to-do RAM provides the addresses to move a first word or sample from channel(0) of processing component 300(5), and a second word or sample from channel(3) of processing component 300(6) to channel(1) of processing component 300(1). As discussed, the input circuitry for a processing component may be a FIFO memory. In the illustrated example, the input circuitry for processing component (1) may be a FIFO memory, such that it may be able to accept more than one word or sample of data per sample rate cycle. When processing component 300(1) retrieves the data from the input circuitry for processing it merely retrieves two samples rather than one from the FIFO.

Figure 10D:
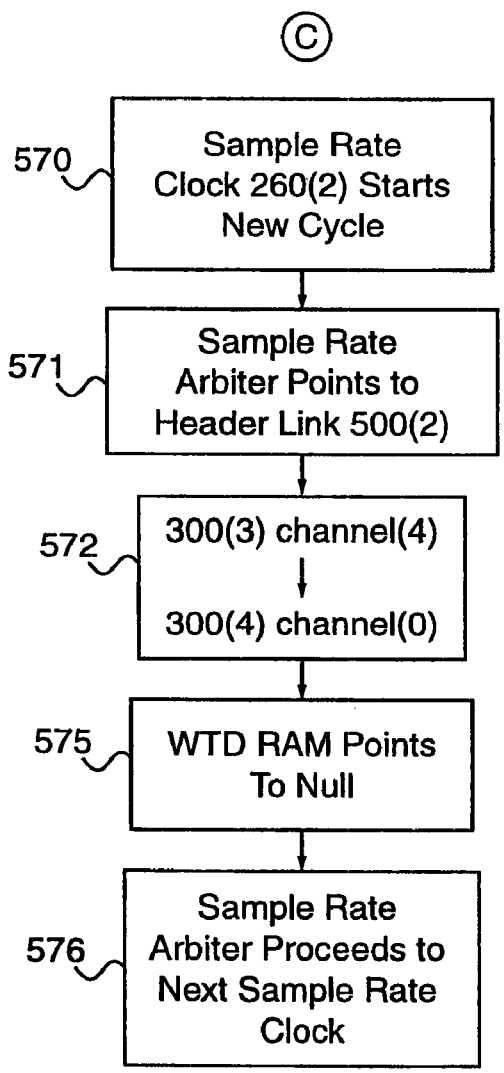
FIG. 10D illustrates the chain of data transfers C of FIG. 10A in accordance with an embodiment of the present invention.
Figure 10E:
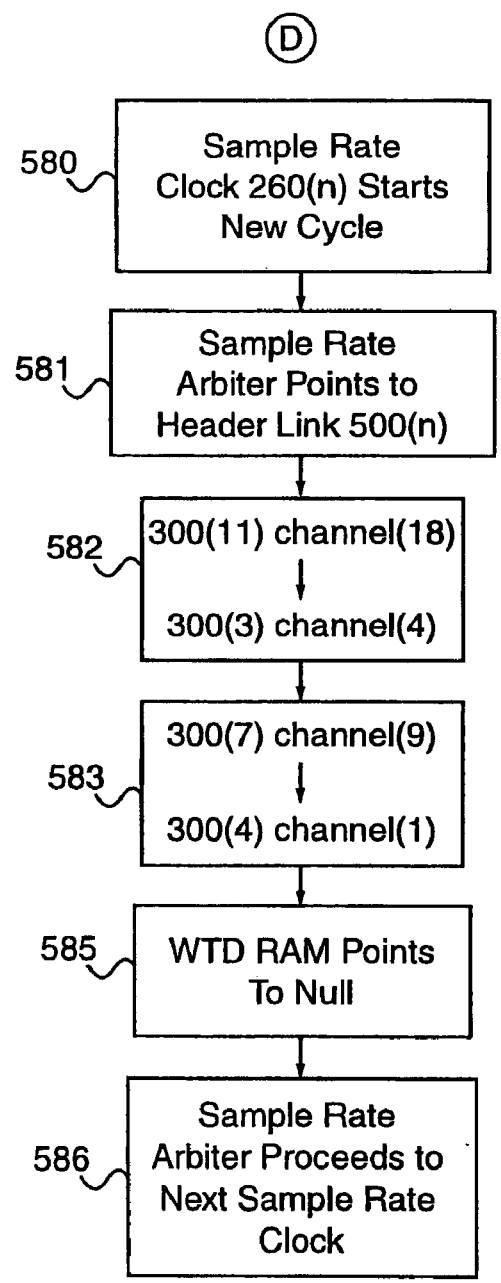
FIG. 10E illustrates the chain of data transfers D of FIG. 10A in accordance with an embodiment of the present invention.

A single channel may also operate at more than one frequency, referring now to FIGS. 10D and 10E. FIGS. 10D and 10E illustrate the operations involved in the chain of data transfers C and D, respectively, of FIG. 10A in accordance with one embodiment. A single channel may have a different input frequency than its output frequency. That particular channel requires data transactions based upon two different sample rate clocks.

By way of example, a processing component may be a sample rate converter, which converts data from one sample rate clock to data tied to another sample rate clock. Blocks 570–571, 575–576, 580–581 and 585–586 are similar to the corresponding blocks of FIGS. 10A and 10B, and for the purposes of brevity will not be discussed in further detail. A major point concerning FIGS. 10D and 10E is the data transactions performed in blocks 572, 582 and 583.

In block 572 work-to-do RAM outputs the appropriate addresses to transfer data from channel(4) of processing component 300(3) to channel(0) of processing component 300(4). Sample rate clock 260(2) dictates the transfer in block 572.

Sample rate clock 260(n) controls the transaction enacted in blocks 582 and 583. Work-to-do RAM 440 outputs the addresses to transfer data from channel(18) of processing component 300(11) to channel(4) of processing component 300(3). Note that channel(4) of processing component 300 (3) outputs data according to sample rate clock 260(2), but receives data according to sample rate clock 260(n). If processing component 300(3) is a sample rate converter the data transfer would indicate that processing component is converting data received at sample rate clock 260(n) into data tied to sample rate clock 260(2). Subsequently, work-to-do RAM 440 may perform another data transfer, as indicated in block 583.

In addition to the types of data transfers described above, other types of data transfers may take place through programmable bus 230. For instance, one channel of a particular processing component may exchange data with another channel of the same processing component. Additionally, a channel may feed back into itself.

Work-to-do RAM 440 and sample rate arbiter 422 are also capable of transferring data from one source to several different destinations. Such a transaction takes place by programming two consecutive destination links with the same source address and the appropriate destination addresses.

When a new data transfer is required, bus arbiter 240 is programmed with the destination and source addresses of the new data transfer. Also, the sample rate clock to which the new data transfers is tied is provided to the bus arbiter 240. In the illustrated embodiment the bus arbiter may be provided the information through bus interface 202 of FIG. 4. In one embodiment, the CPU of the computer system provides the necessary information.

If the sample rate clock of the new data transfer is a currently active sample rate clock (i.e., other data transfers are already tied to the sample rate clock) then a new destination link is appended to the particular chain of data transfers (linked list) associated with the sample rate clock (e.g., A, B, C or D).

In the illustrated embodiment the new data transfer is placed at the end of the linked list. In other embodiments the new data transfer may be placed in any suitable point of the linked list. By way of example, the new data transfer may be placed in accordance to a priority that are placed on the data transfers. Data transfers with higher priority are placed in destination links higher up in the chain of data transfers. Other suitable criteria for placing a new data transfer within a chain may be utilized.

A new linked list is created if no linked list exists for the sample rate clock associated with the new data transfer. The information related to the new data transfer is inserted in the header links locations 441 in a location associated with the associated sample rate clock (e.g., 500(n–2). A new destination link is also created, to which the header link points. However the new destination link is a null pointer until more data transfers for that sample rate clock is scheduled.

When a data transfer is no longer necessary the destination link is removed from the chain of data transfers. If there are no data transfers necessary for a particular sample rate clock then the particular sample rate clock is marked as inactive in sample rate arbitrator 422. Sample rate arbitrator 422 does not vector to the associated header link location until the particular sample rate clock is active again.

The use of multiple linked lists of data transactions, based upon the different sample rate clocks, provides great flexibility in the scheduling and performance of all the possible data transactions. Data transfers may be grouped according to their common sample rate clocks, and may be prioritized accordingly. However, other prioritization schemes may also be implemented to ensure that all data transfers take place in a timely manner.

In an alternative embodiment, a simpler scheduling scheme may be utilized. Scheduling according to sample rate clocks is useful to decrease the possibility of skipping a data transfer.

A simpler method is to limit the frequencies of the sample rate clocks 260(0)–(n) to a maximum frequency. The maximum frequency is chosen based upon the frequency of the system clock and the number of system clock cycles required for a data transfer. The system clock frequency and the maximum sample rate clock frequency are selected to allow all the possible data transfers to be performed within a single cycle of the maximum sample rate clock frequency.

For example, if 20 processing components are tied to the programmable bus, each processing component having 50 channels, the total number of different possible data transfers between the fifty channels is 1000. If the system clock is a frequency on the order of 1,000 times greater than the maximum sample rate clock, and a data transfer can be accomplished within a single system clock cycle, then all of the possible data transfers may be accomplished within a single sample rate cycle of the maximum sample rate clock. Therefore, all the potential data transfers may be fully scheduled.

With a proper understanding of the interaction between sample rate arbiter 422 and work-to-do RAM 440, a detailed description of the operation of bus arbiter 240 follows. Referring back to FIG. 9, sample rate arbiter 422 points to a header link to initiate the current chain of data transfers through multiplexer 430. Work-to-do RAM 440 outputs the appropriate destination and source addresses corresponding to the address pointed to by sample rate arbiter 422.

The active data transfers are initially programmed into work-to-do RAM through b us interface 202 of FIG. 4. Multiplexer 430 provides access to work-to-do RAM 440 for direct programming and to sample rate arbiter 422. Multiplexer 430 also allows work-to-do RAM 440 to vector t o itself using the present destination address to vector to the next destination link.

Thus, the addressing scheme of using the destination addresses as the address for t he next data transfer allows for autonomous operation of work-to-do RAM 440 after a chain of data transfers has been initiated.

Registers 450 and 452 initially buffer the output of work-to-do RAM 440 for synchronization purposes. Register 450 buffers the source address, and register 452 buffers the destination address. And gates 460 and 462 gates the output of registers 450 and 452, respectively, controlled by sample rate arbiter 422. Sample rate arbiter 422 enables gates 460 and 462 so long as work-to-do RAM provides valid destination and source addresses.

Decoders 447 and 448 receive the destination and source addresses, respectively, at different points from the output of work-to-do RAM 440. The decoders determine the channels and processing components to which the destination and source addresses point. The outputs are compared by stall detector 445. Stall detector 445 is designed to generate a stall signal to sample rate arbiter given certain conditions.

In the illustrated embodiment stall detector 445 generates a stall signal in at least two different situations. In a first situation, stall detector 445 generates a stall signal when the source and destination addresses of a single data transfer belong to the same processing component. As discussed, certain processing components may not be capable of both sending and receiving data simultaneously. In those cases, bus arbiter 240 prevents data transfers to and from a single processing component. However, other embodiments may permit such data transfers.

In a second situation, a processing component may not be accessed during a given number of sample rate cycles upon start up. Many processing components may require lengthy start up times before any data is written to or read from the processing components. Stall detector 445 may be configure to prevent access to those processing components until a sufficient amount of time has elapsed.

Alternatively, transactions related to a processing component that is being initialized may be skipped rather than stalling all the pending transactions. The skipped transactions may be performed at the first valid sample rate cycle for that processing component.

In another embodiment, a transaction may be skipped within a single sample rate cycle. For example, some processing components may need time after a sample rate cycle to perform housekeeping functions or duties before it can proceed with another transaction. Transactions related to those processing components may be scheduled in later system clock cycles in the sample rate cycle rather than in the first few system clock cycles of the sample rate cycle.

A stall signal causes the sample rate arbiter 422 to disable gates 460 and 462, such that no data transfers take place along programmable bus 230. Depending upon the type of stall, sample rate arbiter disables gates 460 and 462 for any given number of system clock cycles.

Sample rate arbiter may independently generate stalls as well. Particularly in the case of direct access to work-to-do RAM through bus interface 202 of FIG. 4. New header and destination links may be programmed during active operations. Direct access may in certain embodiments take precedent over the operation of sample rate arbiter 422. During the direct access sample rate arbiter 422 disables gates 460 and 462 to generate stalls. Sample rate arbiter 422 may generate a stall in other situations, depending upon the specific implementation of the present invention.

A null decoder 435 also decodes the destination address generated by work-to-do RAM 440. Null decoder 435 determines whether the work-to-do RAM 440 has reached the end of a chain of data transfers. Null decoder 435 signals the sample rate arbiter when a null address is detected in the destination address. The sample rate arbiter 422 then moves on to the next active sample rate clock in priority, and points to the corresponding header link to initiate a new chain of data transfers.

Registers 464, 466, 468 and 469 subsequently buffer the outputs of work-to-do RAM for synchronization purposes and to provide the early versions of the destination and source addresses. Bus arbiter 240, thereby, provides destination address 244, source address 246, early destination address 244' and early source address 246'. And, as discussed, bus arbiter 240 also produces buffer select signal 242. In one embodiment bus arbiter 240 may also generate system clock 245, or system clock 245 may be generated by an external source.

Through the generation of the addresses and buffer select signals bus arbiter 422 schedules and controls the exchange of data between the processing components. The addresses identify and instruct the particular processing components to perform a particular data transfer. A discussion of how the processing components interpret the signals generated by bus arbiter 240 now follows in reference to FIGS. 11 and 12.

Figure 11:
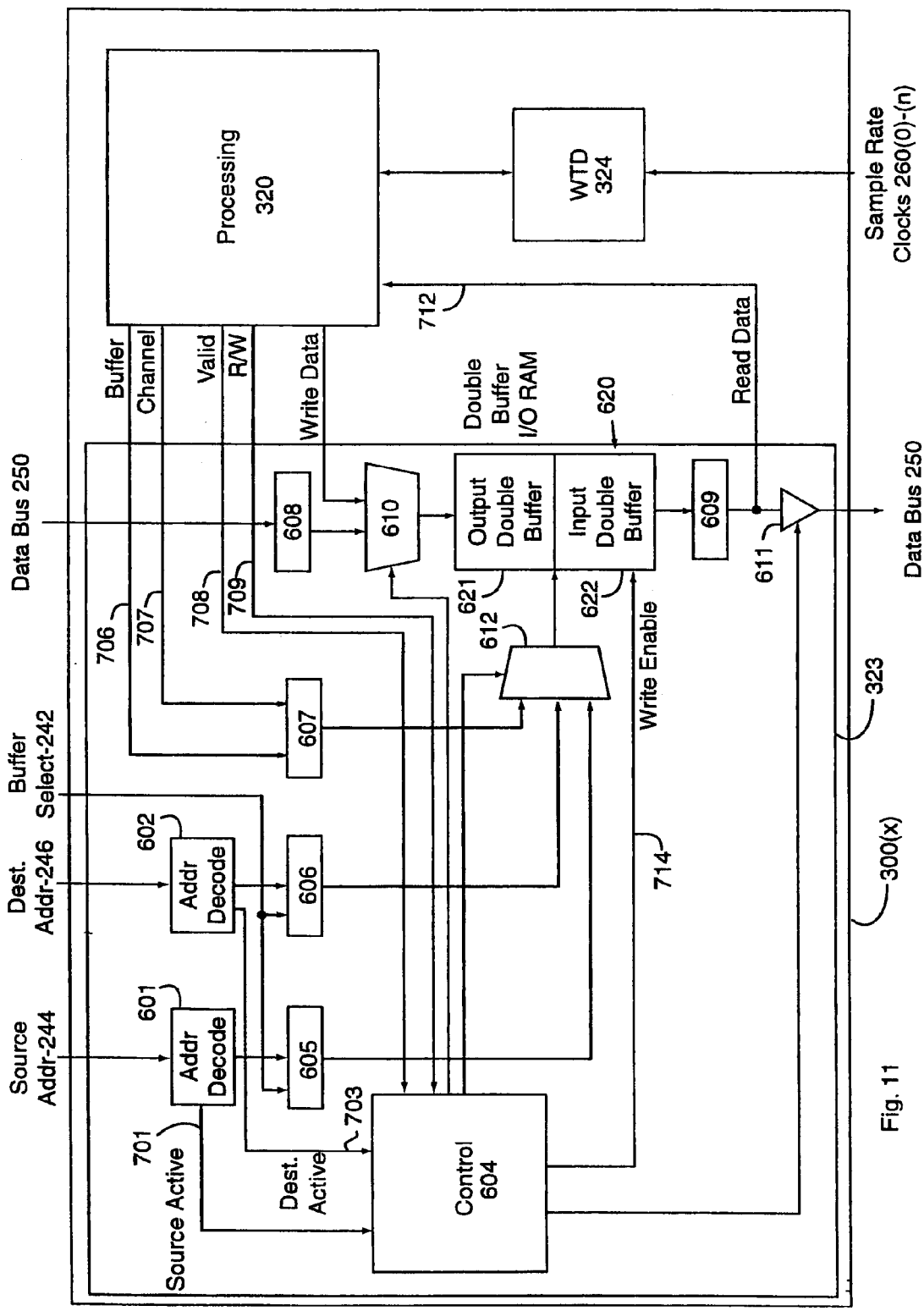
FIG. 11 illustrates an interface circuit of a processing component in accordance with an embodiment of the present invention.

FIG. 11 illustrates a block diagram of a processing component 300(x) in accordance with an embodiment of the present invention. Processing component 300(x) includes a data interface 323, a processing circuitry 320 and a work-to-do block 324. Data interface 323 handles the output and input of data from data bus 250 of programmable bus 230.

The discussion in reference to FIG. 6 included a description of a generic model of a data interface 323. Basically, the generic model of data interface 323 embodies one aspect of the present invention—the use of double buffering to allow processing of one set of data while exchanging another set of data during a sample rate cycle. The techniques of double buffering specifically discussed herein does not limit the present invention. The use of any suitable double buffering technique to facilitate the exchange of data across a mutual bus falls within the scope of the present invention.

FIG. 11 illustrates one embodiment of a data interface 323 of processing component 300(x) in accordance with the present inventions. Data interface 323, in the illustrated embodiment of FIG. 11, includes a control block 604, a double buffer input/output RAM 620, a source address decoder 601, a destination address decoder 602, registers 605–609, multiplexers 610 and 612, and output buffer 611.

Source address decoder 601 and destination address decoder 602 decode source address 244 and destination address 246, respectively. If source address 244 contains an address that corresponds to processing component 300(x) source address decoder 601 sends a source active signal 701 to control block 604. Similarly, if destination address decoder decodes a valid address for processing component 300(x) from destination address 246 a destination active signal 703 is triggered.

Control block 604 utilizes the source active 701 and destination active 703 signals to control the input of data from data bus 250 to double buffer I/O RAM 620. The received address, either source or destination, are received and buffered in registers 605 or 606, respectively. The addresses include the address for a specific channel of processing component 300(x) that is being accessed. The registers also capture buffer select signal 242 along with the addresses. The buffer select signal and the address determine the placement or the retrieval of the data from double buffer I/O RAM 620.

The augmented addresses from registers 601 and 602 pass through multiplexer 612. Control block 604 controls multiplexer 612 to determine which address is utilized for a specific operation. Control block 604 decodes the source and destination active signals to make a decision as to which address is to be utilized to access double buffer I/O RAM 620. Control block 604 may also perform internal reads and writes to and from processing circuitry 320.

Multiplexer 612 passes the augmented address from register 605 when a read operation is performed. The multiplexer passes the augmented address to the double buffer I/O RAM. Double buffer I/O RAM 620 includes an output double buffer 621 and an input double buffer 622. During a read operation output double buffer 622 is accessed with the augmented address from register 605. Data from output double buffer 621 is passed through register 609, and out through output buffer 611.

Multiplexer 612 passes the augmented address from register 606 during a write operation. The augmented address from register 606 accesses input double buffer 622. The input double buffer RAM receives data from data bus 250 through register 608 and multiplexer 610.

The input and output double buffers contains two sets of buffers, buffer A and buffer B. As discussed earlier, one set of buffers is used for external data exchange, while the other set of buffers are used to exchange data with processing circuitry 320. In a subsequent sample rate clock cycle the operations of the sets of buffers are exchanged. The buffer select signal, incorporated into the augmented addresses stored in register 605 and 606, determines which of the sets of buffers is accessed during an external data exchange.

In an alternative embodiment processing component 300(x) independently keeps track of which set of buffers, buffer A or buffer B, is to be used for external data exchanges or internal communication with processing circuitry 320. In that case, processing component 300(x) does not receive buffer select signal 242.

Internally, processing circuitry 320 receives data from and writes data to double buffer I/O RAM 620. During a read operation, processing circuitry provides a channel address 707 and a buffer address 706. Register 607 captures channel address 707 and buffer address 706. The address held in register 607 is directly analogous to the augmented addresses held in registers 605 and 606. All the addresses are passed through multiplexer 612.

Processing circuitry 320 also provides a valid signal 708 and a read/write signal 709 to control block 604. When control block 604 receives valid signal 708 it allows the processing circuitry to interact with double buffer I/O RAM 620. During a write operation control block 604 controls multiplexer 612 and multiplexer 610 to pass write data 710 from processing circuitry 320 to output double buffer 621. During a read operation control block 604 causes input double buffer 622 to output data. The data passes through register 609 and received by processing circuit 320. Control block 604 disables output buffer 611 to avoid passing the data to the data bus.

Figure 12:
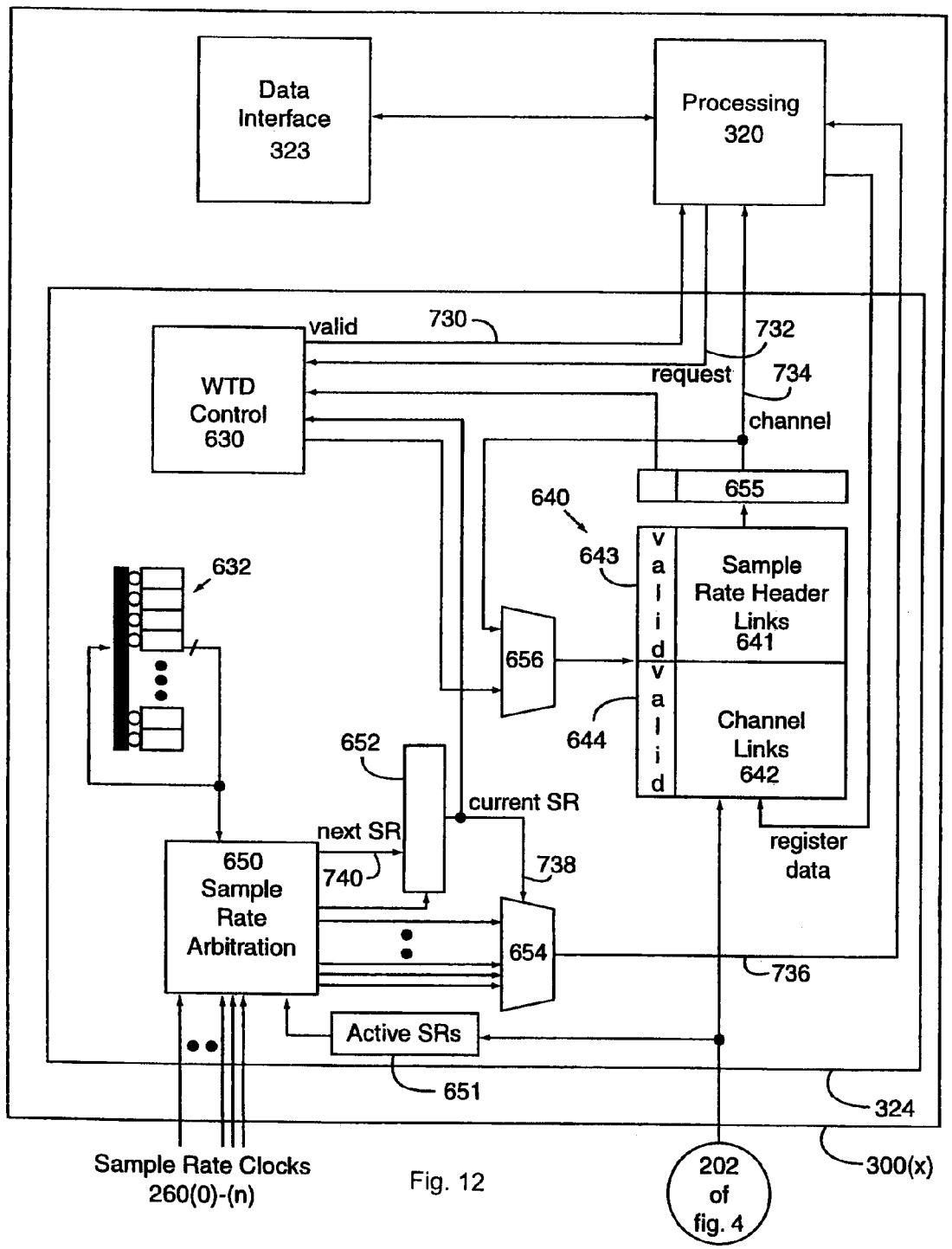
FIG. 12 illustrates a work-to-do block of a processing component in accordance with an embodiment of the present invention.

Work-to-do block 324 controls the timing of the transaction between processing circuitry and data interface 323, now referring to FIG. 12. FIG. 12 illustrates a block diagram of work-to-do block 324 in accordance with an embodiment of the present invention. Work-to-do block 324 includes a work-to-do control block 630, a processing component work-to-do RAM 640, a processing component sample rate arbiter 650, a active sample rate register 651, a last buffer register 632, registers 652 and 655 and multiplexers 654 and 656.

Work-to-do block 324, generally, directs processing circuitry 320 to take data from the appropriate set of buffers (either buffer A or B) from input double buffer 622 for processing, and to place processed data in the appropriate set of buffers. Work-to-do block also informs processing circuitry 320 which of the channels of the processing component are active.

Processing component sample rate arbiter 650 receives one or more sample rates 260(0)–(n) from programmable bus 230. The illustrated embodiment describes a work-to-do block 324 capable of handling more than one sample rate. The handling of more than one sample rate provides the channels of the processing component the ability to operate at different sample rates. In alternate embodiments, where the processing component operates at a single sample rate, the implementation is significantly simpler than the illustrated embodiment.

The processing component sample rate arbiter 650 keeps track of all the different channels in operation and their respective sample rates. Processing of data related to the channels are scheduled by processing component sample rate arbiter 650 along with processing component work-to-do RAM 640.

Active sample rate register 651 contains information about which sample rates are being used by the processing component. Active sample rate register 651 is directly programmed. In the illustrated embodiment the active sample rate register may be programmed through bus interface 202 of FIG. 4 or through bus arbiter 240.

Processing component sample rate arbiter 650 maintains the status of the different channels using the information in active status register 651, the sample rate clocks 260(0)–(n) and last buffer register 632. Last buffer register 632 includes a number of inverting bit registers equal to the number of sample rates the processing component is capable of handling. Last buffer register 632 stores the last buffer (i.e., of the double buffers, either buffer A or buffer B of output and input double buffers) that the processing circuitry accessed. Each bit of the last buffer register 632 is inverted and fed back to itself. Processing component sample rate arbiter 650 reads and updates a particular bit of last buffer register 632 at the start of a new cycle of the sample rate clock associated with that particular bit. Thus, each bit alternates at the start of a new sample rate cycle associated with each bit. Double buffering requires swapping the functions of the double buffers at the start of each new cycle. Thus, each bit of last buffer register information is inverted such that the processing component sample rate arbiter 650 knows which buffer the processing circuitry should currently access. The last buffer register 632 is compared with the active status register 651 and the sample rate clock lines 260(0)–(n) to determine which sample rate clocks need to be serviced. In another embodiment, last buffer register may be implemented using individual registers and a clock to set/clear the bits.

With these pieces of information, the processing component sample rate arbiter, in conjunction with multiplexer 654 generates a current buffer signal 736. Processing circuitry 320 receives current buffer signal 736 along with information about which channel requires processing.

Processing component sample rate arbiter 650 and register 652 indicate which sample rate is currently being processed, generating a current sample rate signal 738. A next sample rate signal 740 indicates which sample rate is next in line for processing. Processing component sample rate arbiter 652 shifts next sample rate signal 738 into register 652 when work-to-do block 324 has provided processing circuitry information about all the channels tied to the previous sample rate. Next sample rate signal 740 then becomes current sample rate signal 738.

Sample rate arbiter 650 prioritizes the sample rates according to the order they became active. In another embodiment sample rates may be prioritized in any suitable manner. By way of example, the sample rate data stored in active sample rate register 651 may be ordered according to priority, or priority may be based upon the frequencies of the sample rates. In an alternate embodiment, priority information regarding the sample rates may be stored in another register.

Work-to-do control block 630 receives current sample rate signal 738 and uses the signal to point to the appropriate channel that processing circuitry 320 should be processing. Work-to-do control block 630 points to the current channel, which is located in processing component work-to-do RAM 640. Processing component work-to-do RAM 640 provides a current channel signal 734 to processing circuitry 320. Along with current buffer signal 736 provided by processing component sample rate arbiter, current channel signal 734 informs processing circuitry 320 which channel and buffer requires processing.

Initially, processing circuitry 320 requests work-to-do control block 630 to provide a new current channel signal 734 through request signal 732. Work-to-do control block 630 responds by sending a valid signal 730 to processing circuitry 320 when current channel signal 734 is ready. Before sending valid signal 730 to processing circuitry 320 work-to-do control block 630 points to the current channel ready for processing in processing component work-to-do RAM 640.

At the beginning of a new sample rate, work-to-do control block 630 first points to a sample rate header in processing component work-to-do RAM 640. Similar to work-to-do RAM 620, processing component work-to-do RAM includes a sample rate header links 641 and channel links 642. The sample rate header links 641 include valid bits 643. Channel links also include valid bits 644.

Sample rate header links 640 includes a number of sample rate header links equal to the number of sample rates that the processing component is capable of handling. Sample rate header links that are currently active have valid bits 643 that are enabled; inactive sample rate header links having disabled valid bits.

Channel links 642 includes a number of channel links equal to the number of channels that the processing component is capable of handling. Valid bits 644 indicate whether the particular channel is valid.

Each sample rate header link 640 and channel link 642 contains data that indicates which channel currently needs processing. A chain of channels is created much like the vectoring system discussed in reference to work-to-do RAM 440 of FIG. 9. Each channel in the chain of channel links corresponds to the channels tied to a particular sample rate. The current channel data also acts as a vector address to a channel link 642 next in order. The channel link contains data that indicates the next channel ready for processing. The last channel link at the end of a chain of channel links has a valid bit 644 that is disabled.

Register 655 contains the output of processing component work-to-do RAM 640—the current channel ready for processing and the associated valid bit. The current channel signal 734 is fed back to processing component work-to-do RAM 640 through multiplexer 656 to vector to the next channel link. Work-to-do control block 630 receives the valid bit portion of the data held in register 655, which is passed on to processing circuitry 320 as valid signal 730. Processing circuitry 320 then retrieves current channel signal 734 and current buffer signal 736.

When work-to-do control block 630 receives a disabled valid bit, work-to-do control block 630 points to the next sample rate header link 640 based upon current sample rate signal 738. Pointing to a new sample rate header link 640 begins a new chain of channel links.

Direct programming activates a new sample rate header, or a new chain of channel links, or a new channel within an active chain. In the illustrated embodiment, direct programming takes place through bus interface 202 of FIG. 4. New active channel links are added to the end of a current chain. The valid bit of the channel link preceding the new end channel link is enabled, and the channel link address of the new end channel link is placed as the data of the preceding channel link. The valid bit of the new end channel link is then disabled to indicate it is the end of the chain of channel links.

A channel link is removed from a chain of channel links by changing the data of the preceding channel link to vector to the succeeding channel link in the chain. The removed channel link is thereby omitted from the vectors of the preceding and succeeding channel links. The valid bit of the removed chain is then disabled. Or if the preceding channel link is the new end channel link its valid bit is disabled.

If the sample rate associated with the new channel link is inactive, the valid bit of the sample rate header associated with the sample rate is enabled. The new channel link is placed in the data of the sample rate header. The valid bit of the new channel link is disabled to indicate the end of the chain of channel links. Subsequent channel links may be added accordingly.

Thus, a programmable bus provides greater flexibility than other types of buses. The flexibility improves the design time for many applications other than audio signal processing. As discussed, any type of processing which requires more than one sample rate clock may take advantage of the present inventions.

In another embodiment, the work-to-do blocks 324 of the individual processing components may be incorporated into the bus arbiter 240. The bus arbiter may then provide all the necessary control signals for the processing components to complete a data transfer. This may be accomplished by individual control signals, or data passed from the bus arbiter 240 to the processing components through the programmable bus 230 or an auxiliary bus.

Additionally, the present inventions may be utilized on many different scales. By way of example, a programmable bus may be implemented on a integrated circuit level, multi-chip module level, board level or systems level. The processing units, whether they be circuits within a single device, or devices on a board, need only have the appropriate input and output circuitry to be able to take full advantage of a programmable bus in accordance with the present inventions.

A bus arbiter, in accordance with the present invention, may be implemented in a variety of ways. A bus arbiter may be completely programmable, as discussed above. In another embodiment, the bus arbiter may be hardwired once a suitable configuration of processing components and transactions have been determined. Alternately, the number of processing components and channels may be fixed, but the variety of transactions may be programmable. Any number of combinations and permutations of a programmable bus arbiter may therefore be accomplished in accordance with the present invention.

While this invention has been described in terms of several preferred embodiments, it is contemplated that alternatives, modifications, permutations and equivalents thereof will become apparent to those skilled in the art upon a reading of the specification and study of the drawings. It is therefore intended that the following appended claims include all such alternatives, modifications, permutations and equivalents as fall within the true spirit and scope of the present invention.

What is claimed is:

1. A programmable bus for transferring data between a plurality of devices operating at two or more sample rate clocks, comprising:

a bus arbiter configure to schedule and conduct the transfer of data between the plurality of devices according to the two or more sample rate clocks, as applicable to each particular data transfer, each data transfer being associated with at least a corresponding one of said two or more sample rate clocks, the corresponding one of said two or more sample rate clocks being associated with a sample rate period within which the data transfer is required to be completed to permit the processing by at least one of said plurality of devices of data transferred on said programmable bus in accordance with said corresponding one of said two or more sample rate clocks, such that the plurality of devices send and receive data at appropriate times so as to complete to the extent possible at least a highest priority transfer of data within the sample rate period associated with said highest priority transfer;

a source address bus, connected to the bus arbiter and the plurality of devices, wherein the bus arbiter asserts a source address on the source address bus to identify a source device of the plurality of devices for a particular data transfer;

a destination address bus, connected to the bus arbiter and the plurality of devices, wherein the bus arbiter asserts a destination address on the destination address bus to identify a destination device of the plurality of devices for the particular data transfer; and a data bus, connected to the bus arbiter and the plurality of devices, wherein the source device provides a first piece of data on the data bus and the destination device receives the first piece of data from the data bus.

2. The programmable bus of claim 1, wherein the source device and the destination device are the same device.

3. The programmable bus of claim 1, wherein the source device includes a first plurality of channel addresses such that the source address indicates a first channel of the first plurality of channel addresses of the source device.

4. The programmable bus of claim 1, wherein the destination device includes a second plurality of channel addresses such that the destination address indicates a first channel of the second plurality of channel addresses of the destination device.

* * * * *